United States Patent
Viscito et al.

(10) Patent No.: US 6,782,135 B1
(45) Date of Patent: Aug. 24, 2004

(54) APPARATUS AND METHODS FOR ADAPTIVE DIGITAL VIDEO QUANTIZATION

(75) Inventors: Eric Viscito, San Francisco, CA (US); Zhijun Tong, Fremont, CA (US)

(73) Assignee: Conexant Systems, inc., Newport Beach, CA (US)

( * ) Notice: Subject to any disclaimer, the term of this patent is extended or adjusted under 35 U.S.C. 154(b) by 0 days.

(21) Appl. No.: 09/507,305

(22) Filed: Feb. 18, 2000

(51) Int. Cl.$^7$ ................................................. G06K 9/36
(52) U.S. Cl. ...................... 382/239; 382/232; 382/251
(58) Field of Search ................................ 382/239, 251, 382/232, 307, 253; 375/240.23, 240.04; 708/203; 348/27

(56) References Cited

U.S. PATENT DOCUMENTS

| | | | |
|---|---|---|---|
| 4,785,349 A | * 11/1988 | Keith et al. | 358/136 |
| 5,079,631 A | * 1/1992 | Lhuillier et al. | 375/240.03 |
| 5,434,623 A | * 7/1995 | Coleman et al. | 375/240.04 |
| 6,125,146 A | * 9/2000 | Frencken et al. | 375/240.24 |
| 6,181,828 B1 | * 1/2001 | Hogan | 382/254 |

FOREIGN PATENT DOCUMENTS

EP          0450984 A2 * 10/1991    ............ H03M/7/30

* cited by examiner

*Primary Examiner*—Anh Hong Do
(74) *Attorney, Agent, or Firm*—Thomas, Kayden, Horstemeyer & Risley, LLP

(57) ABSTRACT

A video quantizer provides for performing quantization adaptively in accordance with perceptual masking characteristics of the human visual system. In a preferred MPEG encoder-IC, a block-based activity quantization modification or "activity-modification" is formed from the combined correlation of block-energy and edge analyses. A luminance-sensitivity modification is then formed and correlated with the activity modification to form an intermediate modification. A nominal-quantization modification is further formed and correlated with the intermediate modification, which is then limited and correlated with a nominal quantization value to form a base modification. Next, a positional-sensitivity modification is formed as a perimeter offset, which offset is correlated with the base modification to form a modified quantization value, and which modified quantization value is then rounded and returned to a rate controller.

45 Claims, 16 Drawing Sheets

APPARATUS AND METHODS FOR ADAPTIVE DIGITAL VIDEO QUANTIZATION

BACKGROUND OF THE INVENTION

1. Field of the Invention

The present invention relates generally to digital video processing and, more particularly, to digital video compression.

2. Discussion of Prior Art

Data reduction occurs during various stages of digital video encoding. However, quantization—which provides one of the best data compression opportunities—is also perhaps the least well-understood.

A typical video encoder receives source data having an initial spatial resolution. Prior to actual coding, the source data is mapped to a typically lower resolution sampling grid ("down-sampled"), filtered and then analyzed for statistical coding metrics according to which coding is then conducted. During coding, an encode-subsystem compresses the pre-processed data, typically using conversion, quantization and other processing to modify successive pictures (e.g. frames, blocks, objects, etc.).

In MPEG-2, for example, block-based motion-compensated prediction enables the use of not only complete picture representations (i.e. intra or I-pictures), but also predicted (P and B) pictures represented by predicted intra-picture motion ("prediction data") and predicted-versus-actual picture or "prediction error" data. The prediction error data is then converted using a discrete cosine transform or "DCT" and then quantized. During quantization, additional bitrate reduction is achieved by replacing higher resolution pictures with lower resolution (lower-bitrate) quantized pictures. Final coding and other processing also provide incremental data optimization.

While several factors can influence the bitrate that is devoted to each picture (e.g. using a corresponding quantization step size), a particularly promising one is perceptual masking. That is, the sensitivity of the human visual system ("HVS") to distortion tends to vary in the presence of certain spatio-temporal picture attributes. It should therefore be possible to model the HVS perceptual masking characteristics in terms of spatio-temporal picture attributes. It should also be possible to determine appropriate quantization step-sizes for received pictures (e.g. in order to achieve a desired quality and/or bitrate) by analyzing the pictures, determining perceptually significant picture attributes and then applying the perceptual model.

The current understanding of perceptual masking is, however, limited and the HVS is considered so complex and the perception of quality so subjective as to elude accurate modeling. See, for example, *Digital Images and Human Vision*, MIT Press (1993); *MPEG Video Compression Standard*, Chapman and Hall (1996), and *Digital Video: An Introduction to MPEG-2*, Chapman and Hall (1997). Nevertheless, attempts have been made to provide some degree of perceptual modeling in order to exploit HVS perceptual masking effects.

For example, many encoders now incorporate a quantizer that modifies or "adapts" a rate-control based nominal quantization step size according to a block energy measurement. FIG. 1, for example, broadly illustrates a typical adaptive quantizer within an MPEG encoder. During quantization, rate controller 101 transfers to quantization-modifier 102 a nominal quantization value $Q_{Nom}$, macroblock data and a macroblock-type parameter. Quantization-modifier 102 processes the macroblock data, typically using sum of differences from DC ("SDDC") or variance techniques, and then transfers to quantizer 103 a modified quantization value, $M_{Quant}$.

Within quantization-modifier 102, formatter 121 organizes each received macroblock into 4 blocks, each block containing an 8-row by 8-column array of pixel values, p(r,c), according to the received (frame-or-field) type parameters. Next, block energy analyzers 122a–d perform an SDDC (or variance based) block energy analysis for each of the blocks, as given by equations 1 or 2 respectively:

$$SDDC(block) = \sum_{r,c=0}^{7} |p(r, c) - mean\text{-} p(block)| \qquad \text{Equation 1:}$$

$$Variance(block) = \sum_{r,c=0}^{7} (p(r, c) - mean\text{-} p(block))^2. \qquad \text{Equation 2:}$$

Each block energy analyzer further maps the total block energy measure for a current block to a corresponding modification value according to equation 3, $$\text{Block quantization mod} = (\alpha \times a + mean(a))/(a + \alpha \times mean(a)) \qquad \text{Equation 3:}$$

wherein "α" is a multiplier (typically equal to 2) and "a" is the minimum block-SDDC or variance in a macroblock. Minimizer 123 next determines the minimum block quantization modification. The resultant minimum is then multiplied by $Q_{Nom}$ to produce $M_{Quant}$, which is transferred to quantizer 103.

Unfortunately, such a block-energy perceptual model provides only a rough approximation of how distortion generally tends to perceptually blend into a picture; it does not necessarily result in a minimized or well-distributed bitrate, and resulting decoded video often exhibits so-called halo effects, mosquito noise and other artifacts. Attempts to improve reliability—typically by formatting macroblocks in a finer 16×16 block array—not only substantially increase processing and storage requirements, but also provide only limited improvement.

Other HVS models have also been attempted. For example, one method attempts to detect characters (e.g. alphanumerics) that are particularly sensitive to distortion and then, when detected, to add appropriate "special case" quantization modifications to an existing perceptual masking model. Unfortunately, despite the sometimes extensive resources currently required for added detection and compensation, no commercially available encoder appears to include an accurate working HVS model, let alone an economically feasible one.

Accordingly, there remains a need for apparatus and methods capable of modeling the HVS and of enabling accurate and efficient video quantization in accordance with perceptual masking.

SUMMARY OF THE INVENTION

The present invention provides for accurate and efficient perceptually adaptive picture quantization and, among other capabilities, enables lower more optimally distributed bitrate video compression.

In one aspect, embodiments of the invention provide a perceptual model found to enable the determination of perceptual masking effects in a modifiable, yet accurate manner. In another aspect, received picture data and/or other information can be analyzed in accordance with perceptually significant picture attributes. Low-resource edge detection, as well as activity, luminance, temporal and positional perceptual significance determination and correlation (e.g. selection, combination, correspondence, etc.) are also enabled. Also provided are multiple-granularity (i.e. resolution, dimension, attribute, etc.) analysis and correlation, which are preferably used to produce perceptually-based quantization modifications.

In a preferred embodiment, adaptive quantization is provided within an MPEG-2 encoder integrated circuit ("IC"). Received picture data is analyzed to determine energy and edge attribute indicators and a multiple granularity correlation of the energy and edge attribute indicators is conducted to provide an activity-based quantization modification or "activity-modification." The received picture data is also analyzed for luminance-sensitivity, and a resulting luminance-modification is correlated with the activity-modification and a further nominal-quantization offset (e.g. reflecting temporal-masking effects) to produce an intermediate modification. The intermediate modification is then limited. Finally, a positional-sensitivity determination is formed as a perimeter offset, which is correlated with the limited intermediate modification. The resulting positionally adapted modification is then rounded or truncated to produce a quantization modification, which is used by a quantizer in performing quantization.

Advantageously, embodiments of the present invention enable effective and efficient perceptual analysis, perceptual modeling, correlation and adaptive quantization. Such capability can, for example, be utilized to facilitate low-bitrate substantially transparent image compression, enhancement and other processing, as well as modifiable processing in accordance with varying image sources, types, identifiable portions and attributes, among other application parameters.

These and other object and advantages of the present invention will become apparent to those skilled in the art after considering the following detailed specification together with the accompanying drawings.

BRIEF DESCRIPTION OF THE DRAWINGS

FIG. 9c is a graph illustrating an example of the application of an edge basis to a block in accordance with the method of FIG. 9a;

DETAILED DESCRIPTION OF A PREFERRED EMBODIMENT

Among other aspects, the present invention enables perceptually significant attributes of received video pictures to be determined and correlated (e.g. via selection, combination, comparison and/or other processing), and a nominal quantization to be modified in a perceptually accurate manner in accordance therewith. Thus, determinably optimized-bitrate, bitrate distribution, overall quality and/or quality distribution can be provided in accordance with perceptual masking characteristics of the human visual system ("HVS"), among other benefits.

For clarity sake, the discussion will focus on a preferred MPEG-2 compliant integrated circuit ("IC") encoder that is capable of implementing adaptive quantization according to the invention. In addition to providing a better understanding of perceptual analysis, modeling and other adaptive quantization improvements, the preferred encoder-IC also illustrates, for example, how such improvements can be achieved utilizing minimal resources. Those skilled in the art will appreciate, however, that the invention is also applicable in a more separated or integrated manner to a wide variety of other implementations and/or systems.

For example, the invention is also applicable to video compression encoders other than MPEG and similar standards (e.g. H.26x), as well as to other applications in which aspects of adaptive quantization might be desirable. Various aspects can further be used in more resource-rich real-time and not real-time systems where it is nevertheless desirable to minimize resource utilization (e.g. PCs, networks/the internet, settop boxes, digital image processing/storage capable devices, etc.). Perceptual analysis, correlation and/or other aspects are also adaptable for use with more extensive automatic, interactively and/or manually effectuated image data processing in accordance with these and other systems. Aspects are further adaptable to implementation alternatives more generally utilized in processing systems, such as PCs (e.g. hardware/software implementation, internal/external code/data origination, destination, execution and/or storage media, remote access, process acceleration, etc.), among yet other examples, only a few of which might be specifically noted herein.

Figure 1:
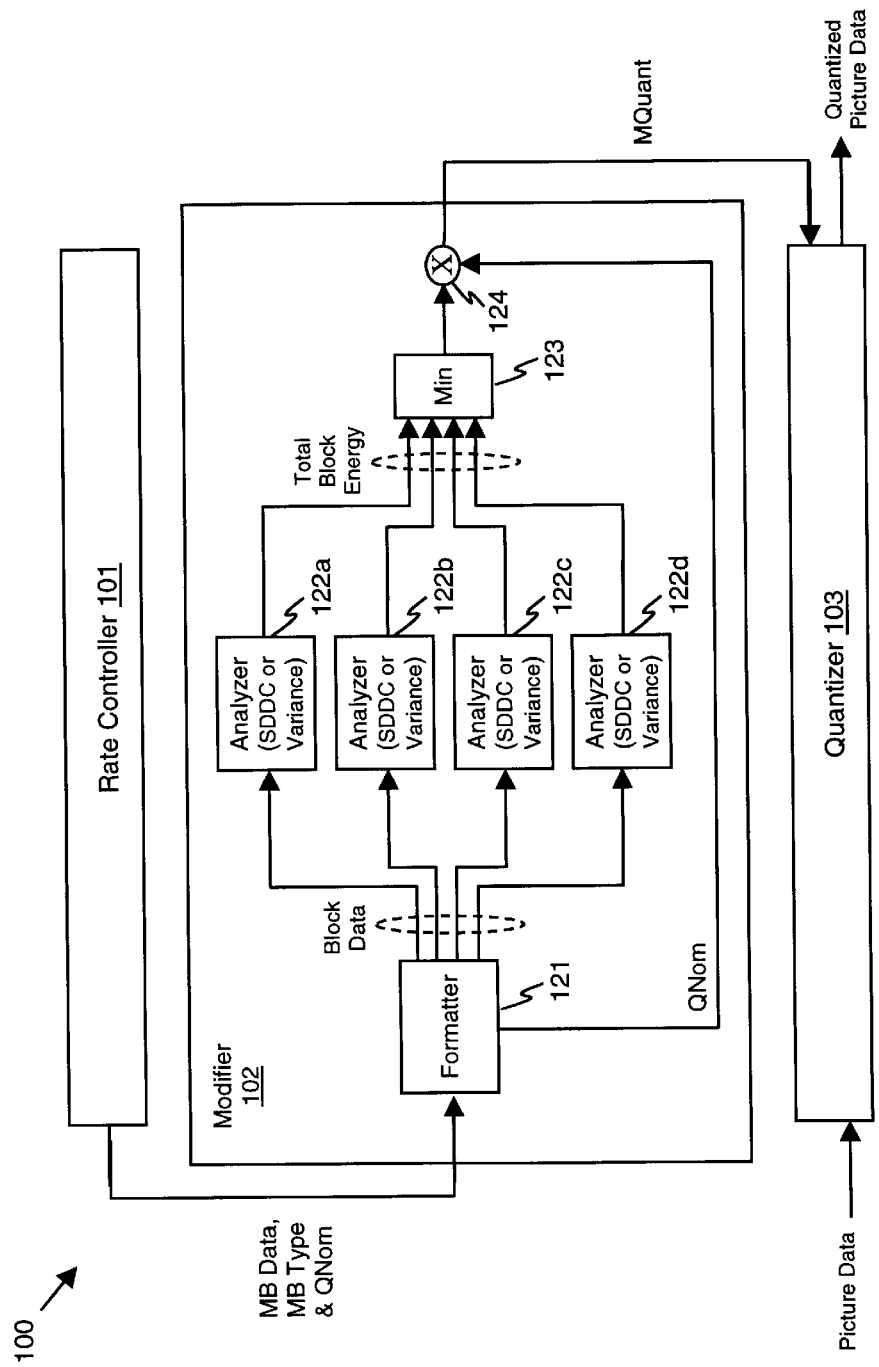
FIG. 1 is a flow diagram illustrating a conventional adaptive quantizer.
Figure 2:
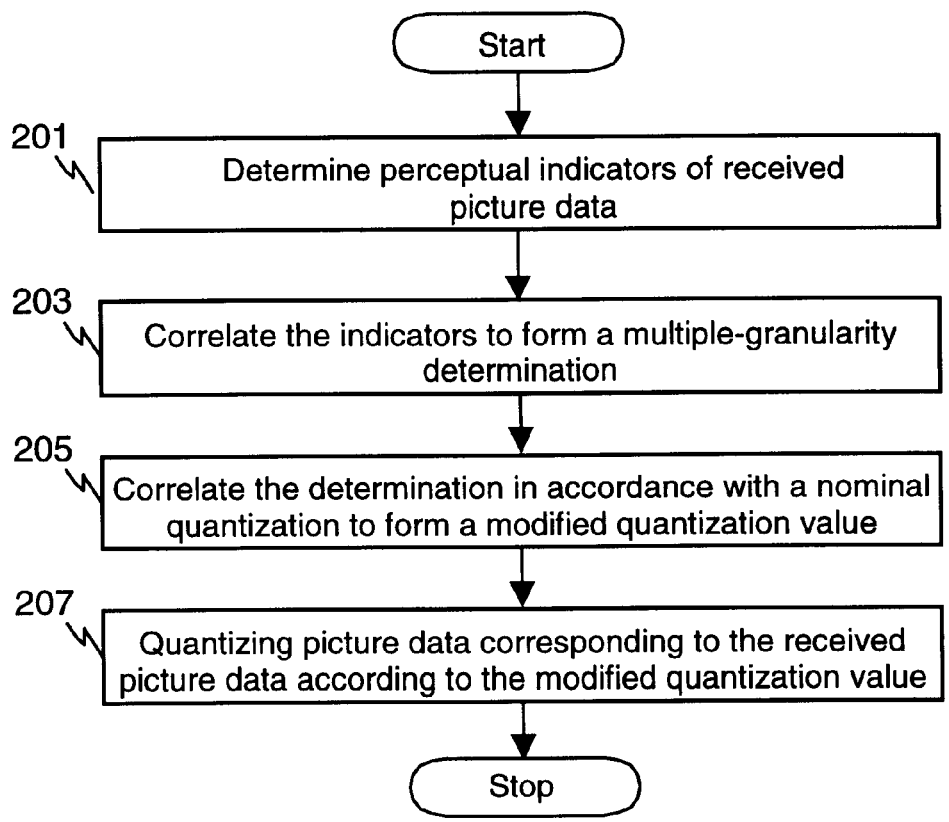
FIG. 2 is a flowchart illustrating an adaptive quantization method according to an embodiment of the invention.

Beginning with the FIG. 2 flowchart, an adaptive quantization method broadly includes determining perceptual indicators of received picture data (step 201), correlating the indicators to form a preferably multiple-granularity perceptual determination (203), correlating the determination in accordance with a nominal quantization to form a quantization modification (e.g. step size) in step 205, and quantizing picture data in accordance with the quantization modification (step 207). Indicator formation and correlation steps 201 and 203 preferably comprise a perceptual masking model of the HVS and application of that model to received picture data. A modified quantization value is then formed adaptively to determined picture attributes (and thus, HVS masking) in step 205.

In the preferred encoder IC implementation (hereinafter, the "encoder-IC"), the perceptual model includes what will be referred to as "activity-masking", "luminance-sensitivity," "temporal-masking" and "positional-sensitivity" determinations.

Among other aspects of the encoder-IC, significant perceptual modeling accuracy and flexibility appears to be attributable to multiple-granularity perceptual determination. Rather than merely adding to an energy model in accordance with detected low perceptual masking picture-attributes, a perceptual model incorporating a combined, multiple granularity determination (e.g. using more than 1 attribute, resolution, dimension, etc.) is found to provide greater accuracy and efficiency. In the encoder-IC, for example, an activity-masking determination correlates (e.g. combines) a broader energy attribute analysis and a narrower spatial-detail analysis as a single perceptual masking determination. Further luminance-sensitivity, nominal quantization offset and picture position-determinations are also preferably conducted in conjunction with the activity-masking determination in executing a complete perceptual masking model.

During testing, a variety of video sequences were encoded using a simulation of the encoder-IC and a reference conventional MPEG-2 encoder. The results were then decoded, displayed and compared. Each element of the encoder-IC was shown to provide benefit separately. For example, activity-masking provided improved quality particularly in the presence of edges; luminance-sensitivity provided particularly improved quality when the brightness of sample images varied over a full luminance range (0–255) and with significant image portions-having a DC value over 200. In addition, combinations of model elements were also shown to provide cumulative benefit.

Figure 3A:
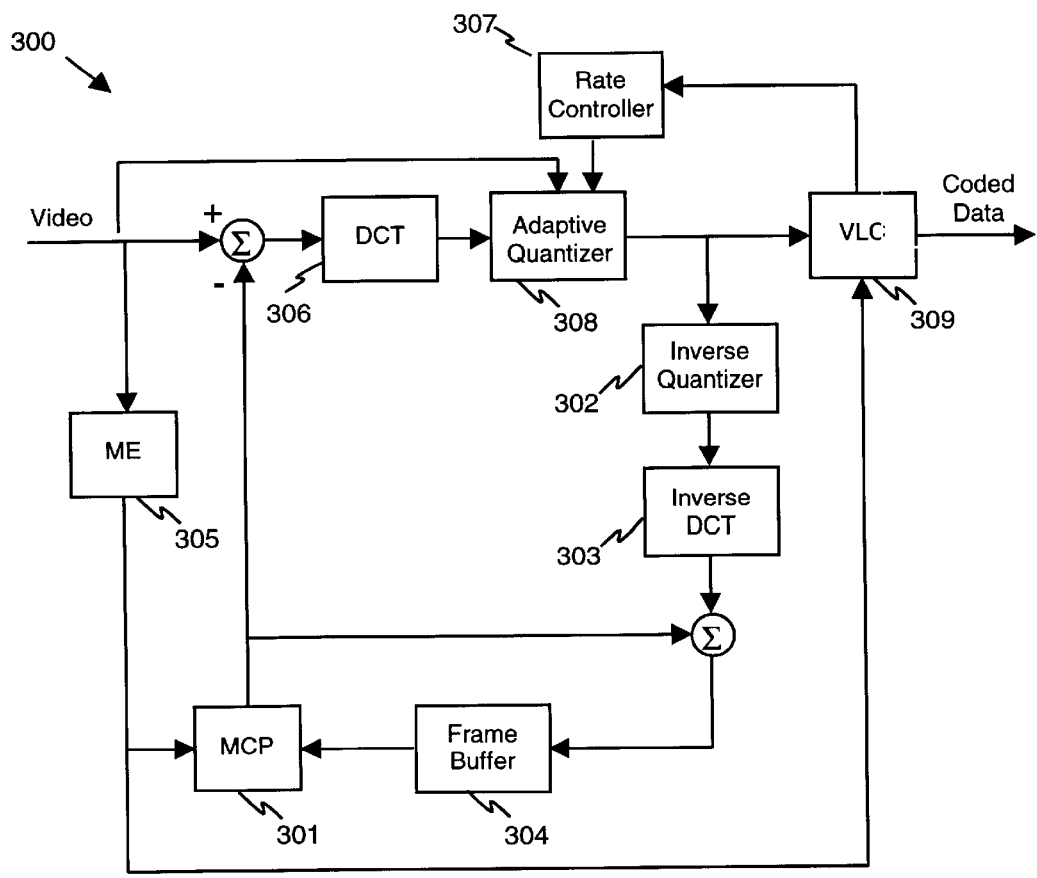
FIG. 3a is a flow diagram illustrating an encode-subsystem or "coder" incorporating an adaptive quantizer according to an embodiment of the invention.

FIG. 3a illustrates how encode-subsystem 300 of the encoder-IC is currently arranged in a generally conventional feed-forward MPEG encoder configuration. As with conventional MPEG-2 encoders, encode-subsystem 300 includes motion-compensated predictor (MCP) 301, inverse quantizer 302, inverse DCT 303, frame buffer 304, motion estimator ("ME") 305, DCT-unit 306, rate controller 307, quantizer 308 and variable-length coder (VLC) 309. Quantizer 308, however, is an adaptive quantizer that preferably replaces a conventional quantizer.

For comparison with the adaptive quantizer 308, a conventional quantizer in the MPEG context would receive an 8×8 block DCT coefficient data from DCT-unit 306 and perform an operation similar to the following:

$$\hat{d}_{rc} = \frac{32 \times d_{rc}}{2 \times Q_{Nom} \times m_{rc}},$$

where $Q_{Nom}$ is the signal received from rate controller 307, $d_{rc}$ is the (r,c)-the DCT coefficient of the block, $m_{rc}$ is the (r,c)-the entry in the MPEG quantization matrix, and $\hat{d}_{rc}$ is the quantized (r,c)-the DCT coefficient. Adaptive quantizer 308 differs from this in that it modifies $Q_{Nom}$ prior to applying the above quantization step.

Operationally, MCP 301 forms a next picture prediction utilizing picture data from frame buffer 304 (i.e. that has been reconstructed by inverse quantizer 302 and inverse discrete cosine transformer 303), plus motion vectors (formed by motion estimator 305). DCT-unit 306 receives the difference between received current picture data and the prediction (i.e. prediction error data), and forms DCT coefficient data. Note that for so-called intra-pictures, motion-compensated predictor 301 outputs fixed values rather than motion-compensated prediction data. This causes the input to DCT-unit 306 to be equivalent to current picture data, rather than prediction error data. The DCT coefficient data is then quantized by (adaptive) quantizer 308 (in accordance with rate controller 307 output), and then variable-length coder 309 codes the quantized-data and motion vectors as variable-length tokens.

Those skilled in the art will appreciate that an adaptive-quantizer can also be incorporated in a similar manner with other codecs and/or encoding/quantization configurations. The invention is also applicable to a variety of data processing scenarios in which varying image-describing data might be quantized and/or otherwise manipulated. Therefore, the term "picture data" is used herein to broadly refer to image-describing data, including but not limited to the more typically encountered cases of actual picture values, prediction error, DCT or other transforms of picture values or prediction error (and/or portions thereof), and so on.

Figure 3B:
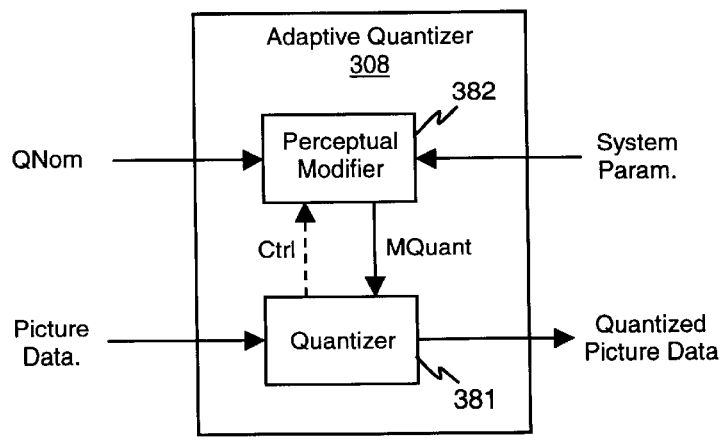
FIG. 3b is a flow diagram illustrating the adaptive quantizer of FIG. 3a in greater detail.

Continuing with FIG. 3b, adaptive-quantizer 308 comprises coupled elements including quantizer 381 and perceptual-modifier 382. Adaptive quantizer 308 broadly operates in a generally conventional manner. That is, picture data is transferred to perceptual-modifier 382 along with a (frame-field) data-type indicator and a nominal quantization value $Q_{Nom}$; quantizer 381 further receives from perceptual-modifier 382 a modified quantization value for a current picture and quantizes corresponding picture data in accordance with the modified quantization value (e.g. a modified quantization step size). Rate-controller 307 can also be used to provide additional nominal quantization values or "offsets" supported by adaptive quantizer 308 (discussed below); however, such offsets are more preferably derived by perceptual modifier 382 to avoid alteration of an existing rate-controller implementation.

Perceptual-modifier 382 processes picture data in accordance with multiple-granularity perceptual modeling to form a corresponding modified quantization value $M_{Quant}$, which it transfers to quantizer 381. More specifically, perceptual-modifier 382 receives complete macroblock data and separates luminance blocks for processing; operational parameters, which facilitate adaptability to varying picture data attributes (such as the MPEG-2 dct_type or picture_structure attributes), can be computed in a number of ways and are preferably received directly by perceptual-modifier 382. While a more or less tightly integrated rate controller and perceptual modifier configuration might be utilized, primarily localized adaptive processing within a perceptual modifier is found to provide adaptive quantization that is efficient, yet more easily modified and incorporated within existing systems.

Perceptual-modifier 382 will now be discussed in greater detail with reference to the remaining figures. For greater clarity, the broader perceptual-modifier configuration will first be discussed in accordance with elements providing similar broad functionality (FIG. 4); a more detailed elemental discussion (FIGS. 5 through 13) will then focus on how combinations of such elements operate together within successive adaptive-quantization stages.

Figure 4:
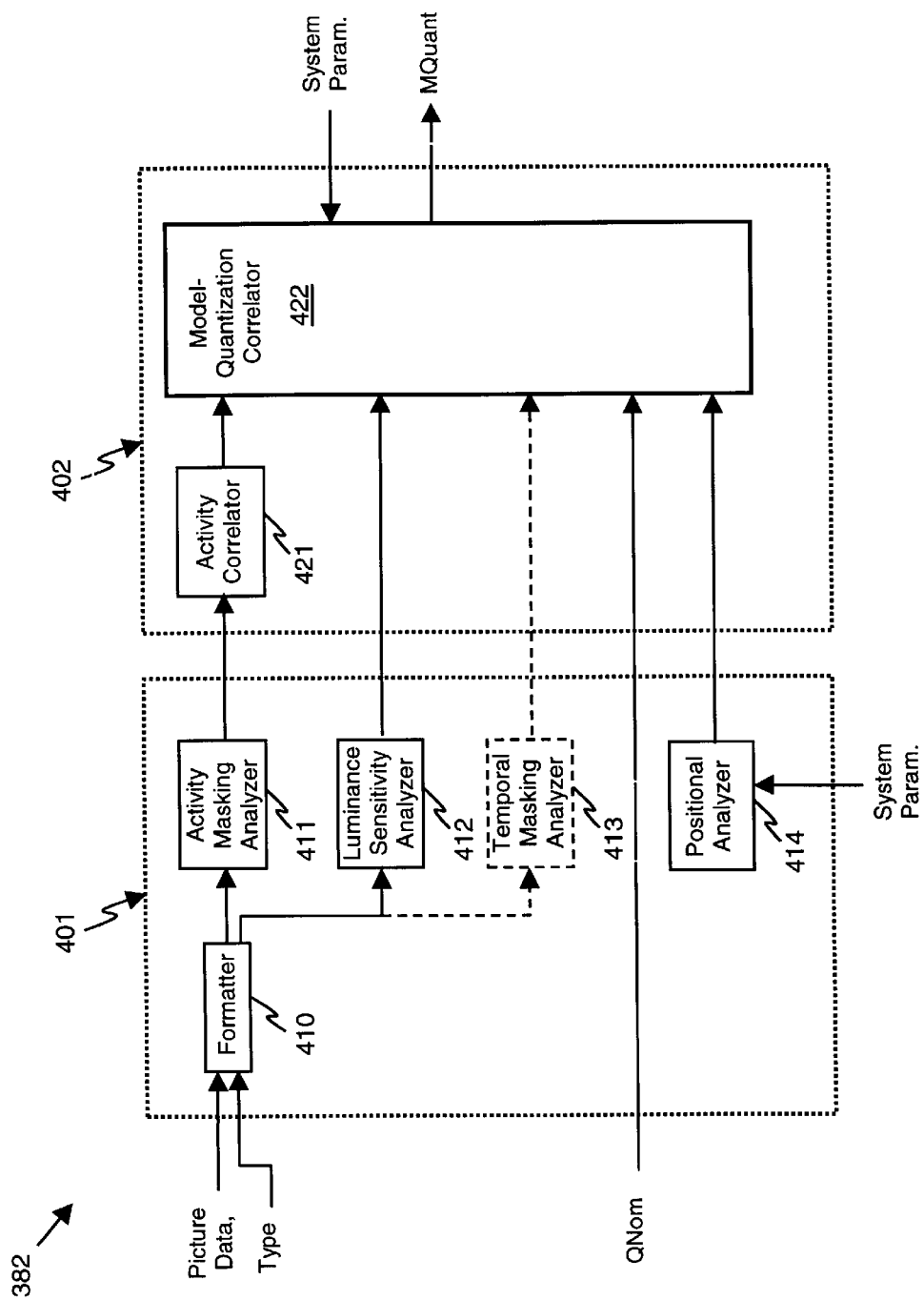
FIG. 4 is a flow diagram illustrating a perceptual modifier according to an embodiment of the invention.

Beginning with FIG. 4, perceptual-modifier 382 of the encoder-IC can be viewed as broadly comprising coupled elements including perceptual analyzer 401 and correlator 402. More specifically, perceptual analyzer 401 includes formatter 410, activity-masking analyzer 411, luminance-sensitivity analyzer 412, temporal-masking analyzer 413 and positional-sensitivity analyzer 414; correlator 402 further includes activity-correlator 421 and model-quantization correlator 422.

Formatter 410 parses received picture data (e.g. macroblocks) for luminance data (e.g. luminance blocks) in accordance with received picture-type parameters and distributes such data to each of activity-masking analyzer 411 and luminance-sensitivity analyzer 412. Successive luminance blocks are preferably distributed in accordance with the received MPEG-compliant macroblock configuration—i.e. as four luminance blocks, each containing an 8×8 pixel array. (Positional parameters are provided directly to positional-sensitivity analyzer 414 and nominal quantization parameters are provided directly to model-quantization correlator 422) Other data and/or block or spatio-temporal region configurations can also be utilized (e.g. inter/intra pictures, objects, backgrounds, complete macroblock data, etc.), particularly with codecs other than MPEG-2 and/or in accordance with a particular application. A further temporal analyzer (413) can also be added to enable source-adaptive quantization offset determination (see below). (The present block configuration is found to provide high efficiency in accordance with MPEG-2 compliant encoding, limited encoder-IC resources and current processing/storage technology.)

Analyzers 411 through 414 perform picture data analyses according to an embodiment of the perceptual model. Activity-masking analyzer 411 receives block data from formatter 410, conducts activity-masking analysis and transfers resulting activity indicators to activity-correlator 421. Luminance-sensitivity analyzer 412 also receives block data from formatter 411, but transfers luminance-sensitivity analysis results ("luminance determinations") to model-quantization correlator 422. Positional-sensitivity analyzer 414 receives positional parameters, and transfers position analysis results ("position determinations") to model-quantization correlator 422.

Correlation elements 421 and 422 provide for processing the above indicators in accordance with the multiple-granularity perceptual model, and for correspondingly modifying the received nominal quantization, $Q_{Nom}$. Activity-correlator 421 processes activity indicators received from activity-masking analyzer 412 to form activity-determinations. Model-quantization correlator 422 further processes the determinations in accordance with nominal quantization parameters and possibly other static and/or dynamic attributes (see the System Parameters input to 422 in FIG. 4) to produce a modified quantization value $M_{Quant}$. (As noted above, correlation can include selection, combination and/or other processing; its nature can vary considerably in accordance with perceptual model refinement, available resources, codec/compression technique compliance and/or other system constraints.)

Figure 5:
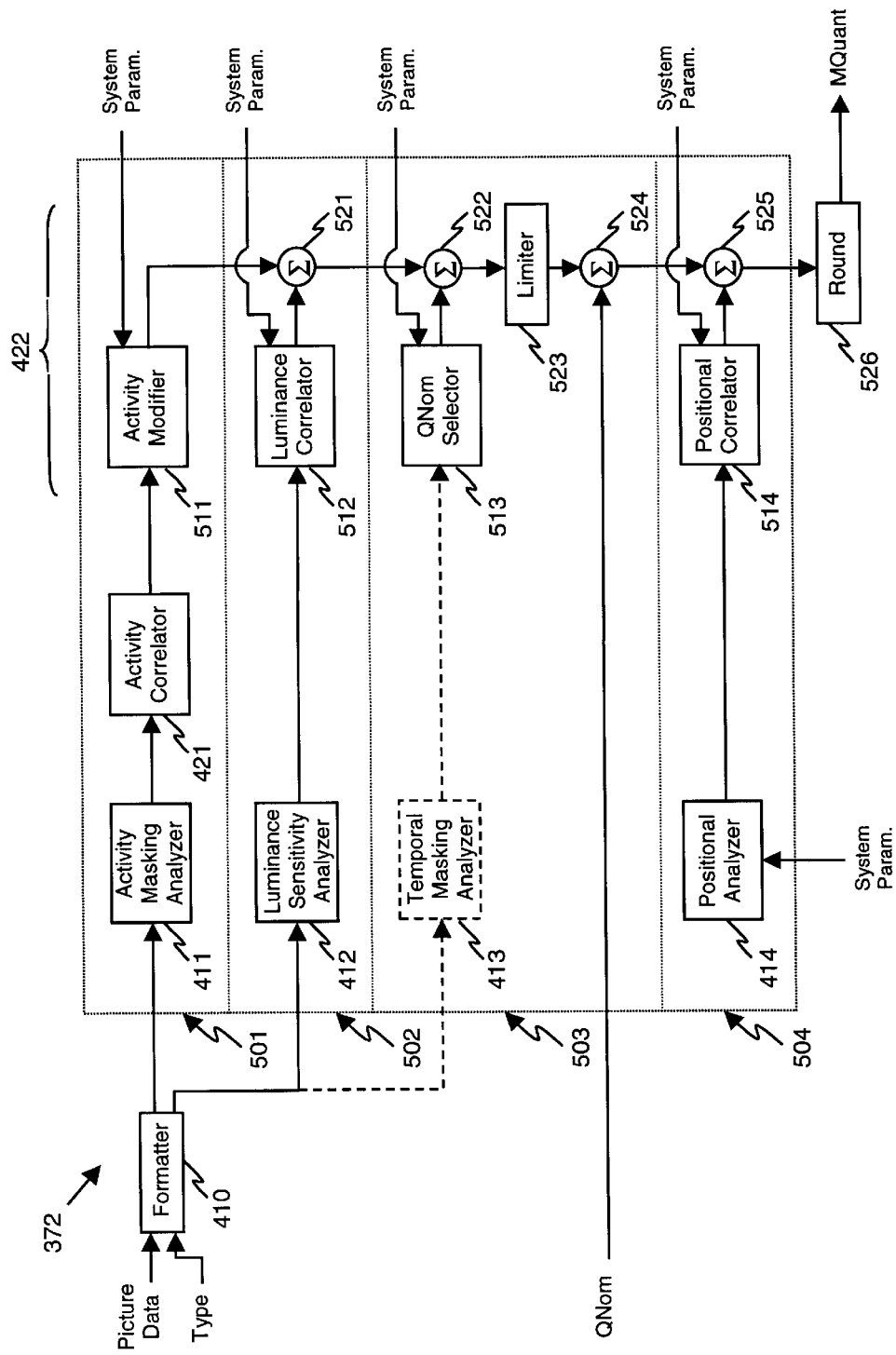
FIG. 5 is a flow diagram illustrating the perceptual modifier of FIG. 4 in greater detail.

Continuing with FIG. 5, perceptual-modeler elements can also be viewed as adaptive quantization stages, each of which might contribute to quantization modification used in forming $M_{Quant}$. FIG. 5 also illustrates a preferred embodiment of model-quantization correlator 422.

As shown, activity-masking analyzer 411 and activity correlator 421 operate in conjunction with activity modifier 511 (of model-quantization correlator 422) to form activity-masking stage 501. Luminance-sensitivity analyzer 412 plus luminance-correlator 512, optional temporal masking analyzer 413 plus nominal quantization selector 513, and positional-sensitivity analyzer 414 plus positional-correlator 514 also respectively form luminance-sensitivity stage 502, quantization selector stage 503 and positional-sensitivity stage 504.

System parameters including preferably register-downloadable values enable further statically and/or dynamically modifiable system response variation. Simple additive combination of quantization modifications (e.g. using processes 521, 522, 524 and 525) is also enabled by preferably pre-processing (e.g. multiplying) downloadable values, as will become more apparent in the discussion that follows (e.g. see charts 1 and 2).

Activity-Masking

Figure 6:
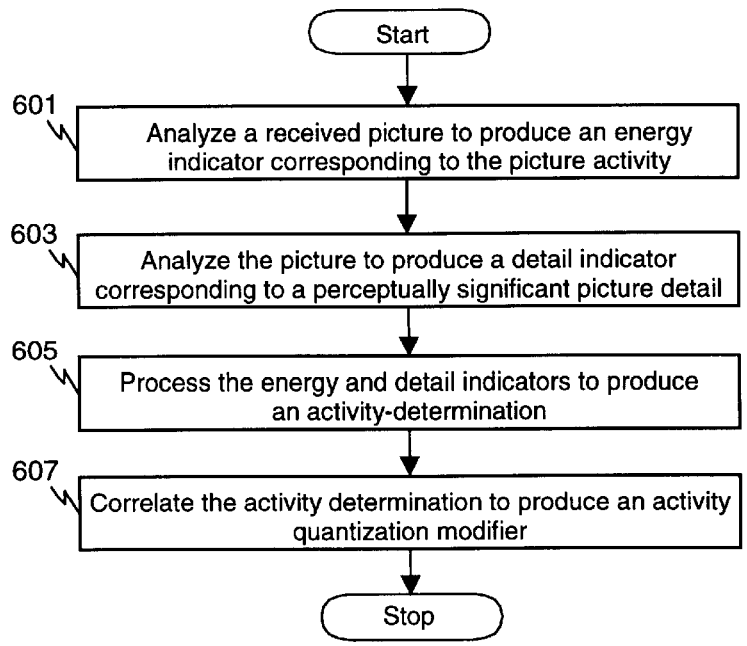
FIG. 6 is a flowchart illustrating an activity modification determination method according to an embodiment of the invention.

Activity-masking stage 501 (FIG. 5) conducts a multiple-granularity perceptual determination that, while incorporating a largely conventional energy analysis, nevertheless provides significant improvements over-conventional systems. FIG. 6, for example, illustrates how an activity masking method of the encoder-IC broadly comprises analyzing a received picture to produce an energy indicator corresponding to picture energy (step 601) and a picture-detail indicator corresponding to a perceptually significant picture detail (step 603). The combination of indicators is then processed as a composite correlation to produce an activity-determination (step 605). More specifically, a picture activity-masking determination is preferably selected in accordance with the combined results of a block energy analysis and an edge prominence analysis. Following activity analysis and correlation, the activity-determination is further modified to form an activity quantization modifier in step 607. (While other aspect, resolution, dimensional and/or other granularity combinations can also be utilized, the encoder-IC is found to be highly efficient, given available resources for conducting perceptually adaptive quantization.)

One of the goals of activity-masking, as implemented in the encoder-IC, is to provide a low resource solution to conventional mis-identification of edges and the resulting use of an overly large quantization step size. However, such a composite determination, alone and in conjunction with other aspects of the encoder-IC, also appears to better model other HVS spatial masking characteristics as well.

For example, in one respect, when a viewer is exposed to moving images, her cognition as to entire images becomes more limited and her focus on whole images can diminish in favor of a focus on portions of the images. An apparently related HVS characteristic is that greater overall spatio-temporal activity and randomness tend to mask distortion better, while visually significant details (e.g. spatial details, such as edges, lines, characters, etc.), larger patterns and deviations from patterns tend to mask distortion more poorly. Activity-masking (as implemented) is found to provide improved edge and overall perceptual masking approximation, but without requiring extensive complex-detail recognition, pattern recognition or separate temporal analysis. Additional analysis and/or correlation can, however, be utilized for still further improvement, as might be desirable in accordance with application constraints, greater resource availability and/or processing/storage advances, among other considerations.

Figure 7:
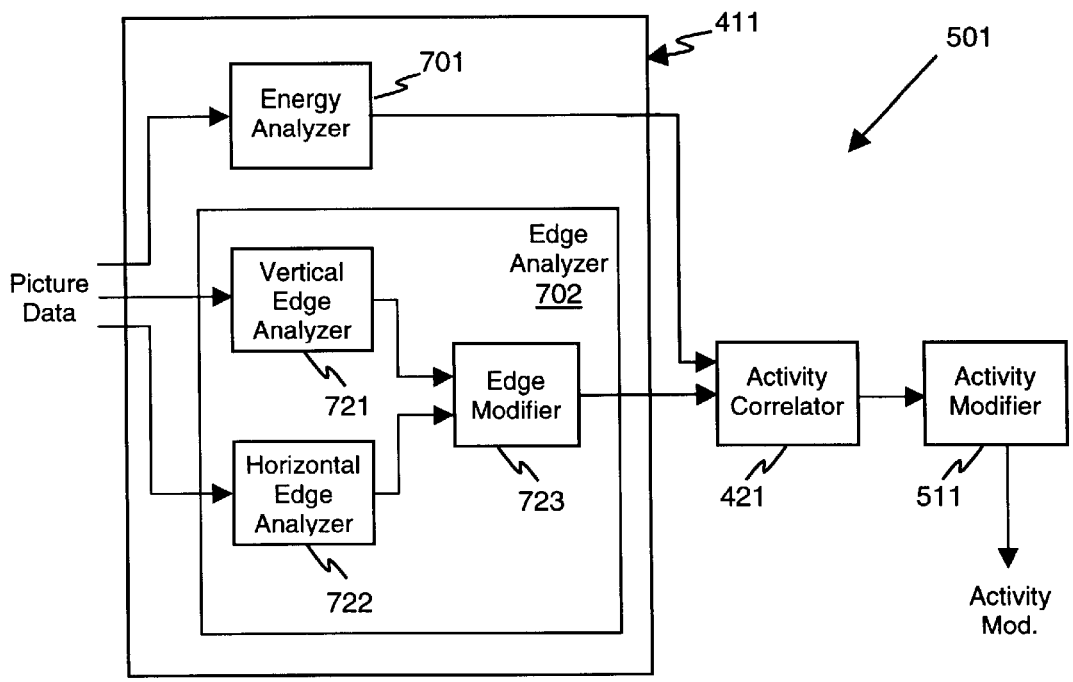
FIG. 7 is a flow diagram illustrating an activity-based quantization modifier according to an embodiment of the invention.
Figure 8:
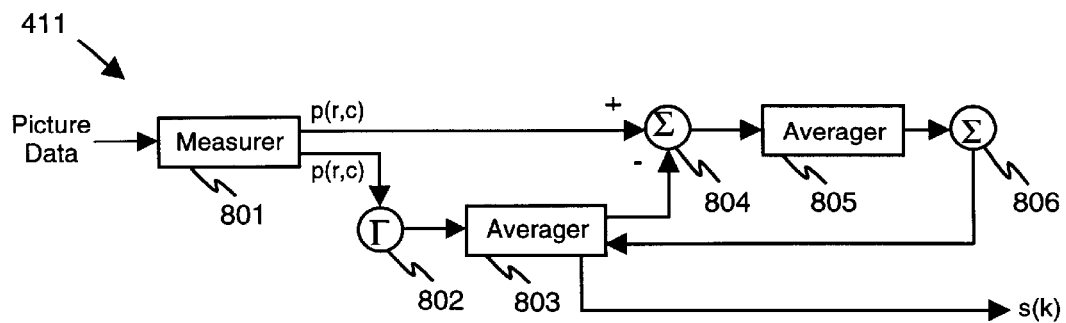
FIG. 8 is a flow diagram illustrating an energy analyzer according to an embodiment of the invention.

As illustrated in FIG. 7, activity-masking analyzer 411 includes energy analyzer 701 and edge analyzer 702, which edge analyzer further includes vertical edge analyzer 721, horizontal edge analyzer 722 and edge modifier 723. Energy analyzer 701 (FIG. 8) preferably conducts energy analysis in a similar manner as with a separated analysis portion of the SDDC technique discussed in the above Background of the Invention. While variance and/or other energy analyses might also be conducted, the current "normalized SDDC" analysis is found to provide a desirable combination of efficiency and accuracy in accordance with currently available encoder-IC resources.

Energy analysis for each block k (k=0,1,2,3) in the current macroblock is conducted by the encoder-IC in accordance with equations 3 and 4 as follows:

$$m(k) = \sum_{r,c=0}^{7} p(r, c)/64 \quad \text{Equation 3:}$$

$$s(k) = \sum_{r,c=0}^{7} |p(r, c) - m(k)|/64. \quad \text{Equation 4:}$$

More specifically, during mean or "DC" block-energy determination of equation 3, measurer 801 (FIG. 8) receives a current luminance block and transfers the DCT coefficient value ("pixel data") for each pixel to mean-summer 802. Mean-summer 802 accumulates the DCT coefficient values and averager 803 divides the accumulated sum by sixty-four (i.e. for an 8-row by 8-column pixel block).

During energy determination (equation 4), measurer 801 transfers current pixel data to function 804. Functions 804 and 805 respectively subtract the already-determined mean coefficient value m(k) from a current pixel-data value and calculate the absolute value (thereby avoiding the use of negative values), which result is summed with that of remaining current-block pixels processed in the same manner by energy-summer 806. Averager 803 then divides the sum by sixty-four to produce an energy measure for the current block or "s(k)."

Figure 9A:
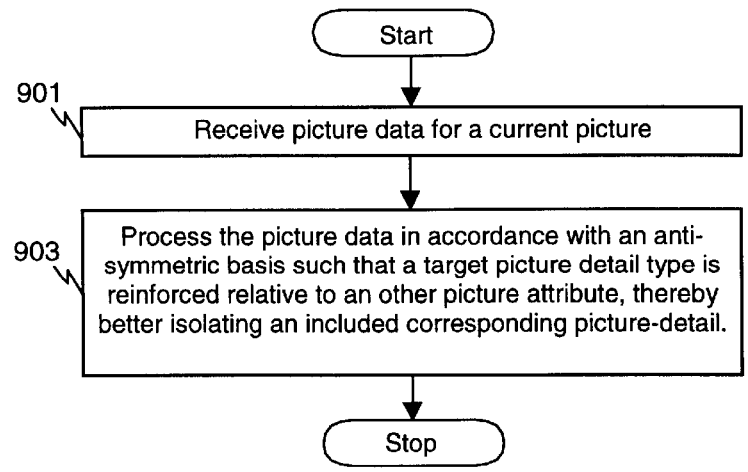
FIG. 9a is a flowchart illustrating an edge analysis method according to an embodiment of the invention.

Edge analyzer 702 (FIG. 7) is operable in accordance with the attribute detection method given in FIG. 9a. As shown, picture information (e.g. DCT pixel data) for a current picture is received (step 901). Portions (e.g. successive rows) of the picture data are then processed (e.g. multiplied and accumulated) in accordance with an anti-symmetric "basis" function such that energy of a target picture detail type (e.g. edges) is reinforced with respect to other attributes (e.g. noise, texture, etc.), thereby better isolating an included corresponding picture-detail (step 903).

While conventional edge detection approaches can be utilized, such approaches are typically extremely resource intensive using conventional technology. The method of FIG. 9a, however, greatly simplifies the edge-detection task (with some loss of accuracy), largely by exploiting the edge-enhancing nature of the selected basis function.

Another advantage of attribute detection (as implemented) is that it is applicable not only to edges energy-based determination or even the DCT domain. The implemented edge detection might be more easily viewed as performing a type of matched filtering, sub-sampled to block resolution. Application of an anti-symmetric basis of the encoder-IC, for example, causes accentuation of like picture attributes (e.g. edges) relative to other attributes (e.g. textures or noise). In this light, it should be apparent to those skilled in the art that attribute detection can be accomplished with other basis functions (such as Hadamard or other transforms). It is applicable to attributes other than edges through appropriate selection of basis functions. Increased accuracy in attribute detection can be achieved through an increase in measurement resolution. Finally, multiple picture attribute types can be analyzed through, for example, parallel use of multiple basis functions.

Figure 9B:
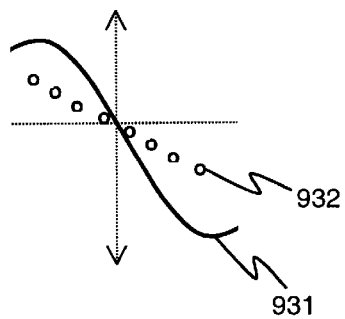
FIG. 9b is a graph illustrating an example of how the application of an edge basis to an edge in accordance with an embodiment of the invention tends to accentuate energy attributable to the edge while tending to cancel other energy.

FIG. 9b illustrates how an anti-symmetric basis is preferably used as a discovered greatly simplified, yet reliable tool for approximating energy contributions within a DCT-domain picture. The FIG. 9b graph includes a plot of an edge that is centered within a block (i.e. edge 931) and a plot of a linear anti-symmetrical basis that is centered on the edge (i.e. transfer function 932).

When the basis is applied to an edge (e.g. by multiplying corresponding pixel and basis values and forming a cumulative product total), positive and negative edge elements are reinforced by corresponding positive and negative transfer functional values, resulting in a large cumulative total. However, when the basis is applied in the same manner to a constant signal at any location, oppositely signed values will be multiplied and a cumulative total will equal zero; similarly, a randomly distributed signal will also tend to be "cancelled out" by basis 932, resulting in a zero or very low accumulated total. Thus, application of basis 932 to edge 931 will effectively isolate and measure the edge.

In the encoder-IC; for example, vertical and horizontal edge analyses are preferably conducted in accordance with equations 5 and 6, $$v\text{-edge}(k) = \left(\sum_{r=0}^{7} g_r\left(\sum_{c=0}^{7} p(r, c)\right)\right)/64 \quad \text{Equation 5:}$$

$$h\text{-edge}(k) = \left(\sum_{c=0}^{7} g_c\left(\sum_{r=0}^{7} p(r, c)\right)\right)/64 \quad \text{Equation 6:}$$

wherein, for a current block k, v-edge and h-edge are vertical-edge and horizontal edge measures respectively, r and c are a current row and column and p(r,c) is a current pixel. The variables, $g_r$ and $g_c$ further represent basis (or, in this case, "edge basis") values in accordance with a preferred edge base given by equation 7

$$g_r = g_c = \{-4, -3, -2, -1, 1, 2, 3, 4\}/4 \quad \text{Equation 7:}$$

Figure 9C:
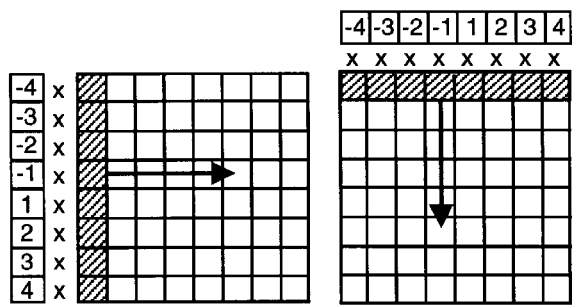

(wherein the indicated values are applied along each row ($g_r$) and each column ($g_c$) of block k respectively, as depicted in FIG. 9c). Thus, application of the edge basis to a row forms a cumulative total of products that are calculated by multiplying each edge base value with a corresponding pixel value within the row, and a vertical-edge analysis forms a cumulative total of edge base applications to each successive row within a current block. (Horizontal-edge analysis applies the edge base to successive columns in a similar manner.) The cumulative vertical or horizontal block total is then averaged according to the 64 pixels in a current block.

Figure 9D:
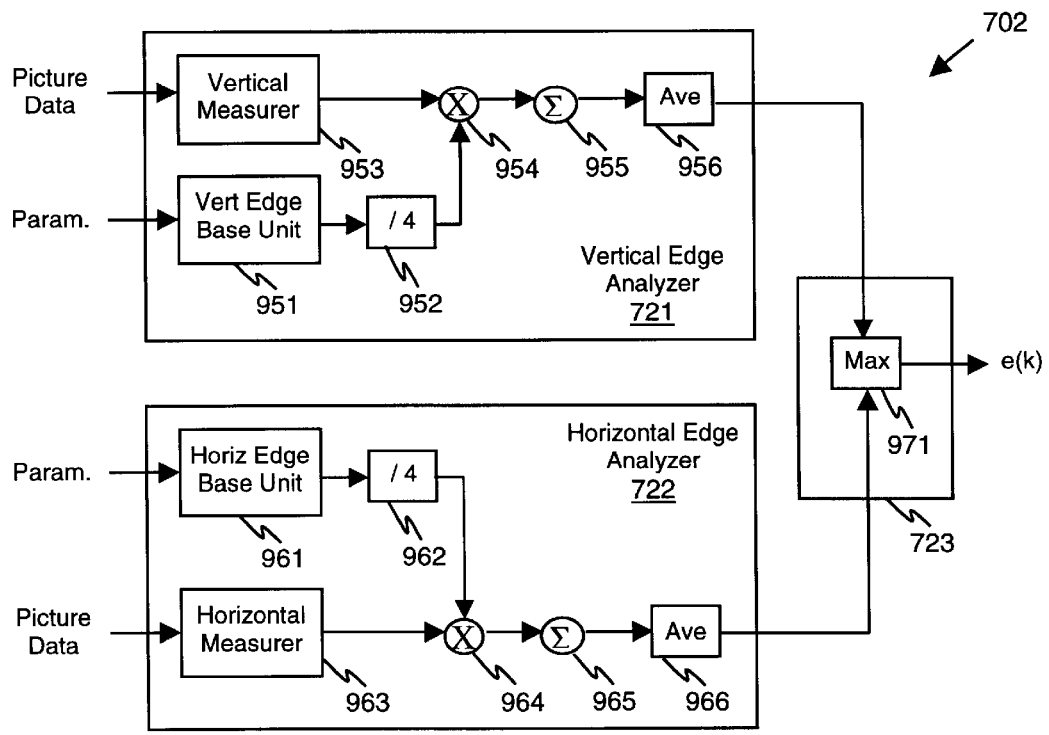
FIG. 9d is a flow diagram illustrating an edge analyzer according to an embodiment of the invention.

As is further illustrated by FIG. 9d, vertical edge analyzer 721 operates in accordance with equation 5 and horizontal edge analyzer 722 operates in accordance with equation 6 to produce respective vertical edge and horizontal edge energy measures. Two edge base units 951 and 961 are preferably provided as programmable registers to enable the application of different vertical and horizontal edge bases. (A single edge basis has thus far been found sufficient for horizontal and vertical edge analyses.)

Edge modifier 723 preferably forms an edge indicator e(k) as the greater value of the vertical and horizontal energy measures (i.e. via process 971). It should be apparent, however, that the two edge measures can be combined in other ways (for example, the sum of horizontal and vertical edge indicators) as appropriate to available resources and/or other system constraints.

The energy and edge indicators (and/or other activity analysis indicators) produced during activity-masking analysis are next correlated and then converted to an activity quantization modifier. More specifically, an activity correlation method (FIG. 10a) includes receiving activity indicators (step 1001), determining a combined-picture correlation corresponding with the activity indicators (step 1003), and determining a quantization modification corresponding with the correlation in step 1005.

Two examples of activity-correlation will now be considered, both of which currently utilize energy-edge analysis results as discussed above. The first example (FIGS. 10b through 10d), which was not ultimately selected for the encoder-IC, provides a more selection-based approach that is less complex and less resource intensive; the second example (FIGS. 10e through 10i), which is currently preferred, provides a more determinative approach that appears to provide greater accuracy and flexibility, but is also more complex and requires greater resources. Various aspects of both should, however, be considered in accordance with particular application constraints. (For easier comparison, activity correlator and activity modifier labels of FIG. 5 are used here as well, but with the addition of respective "a" and "b" designations.)

Figure 10A:
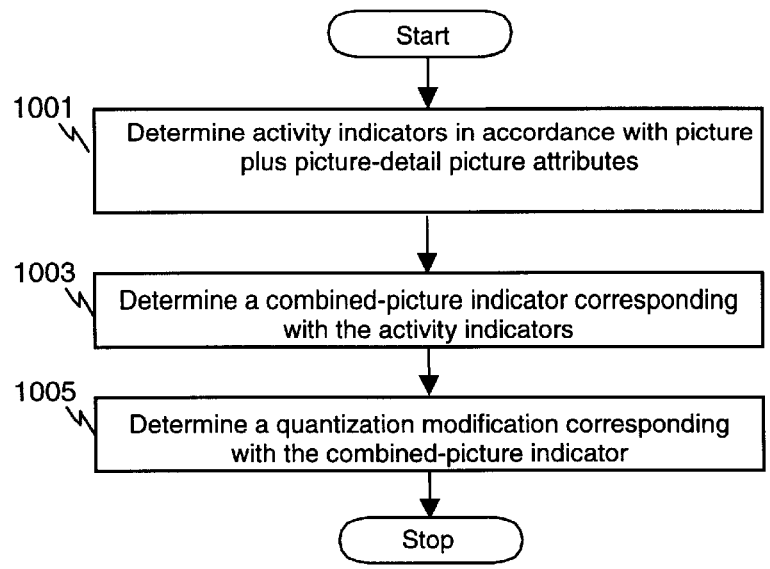
FIG. 10a is a flowchart illustrating an activity correlation method according to an embodiment of the invention.
Figure 10B:
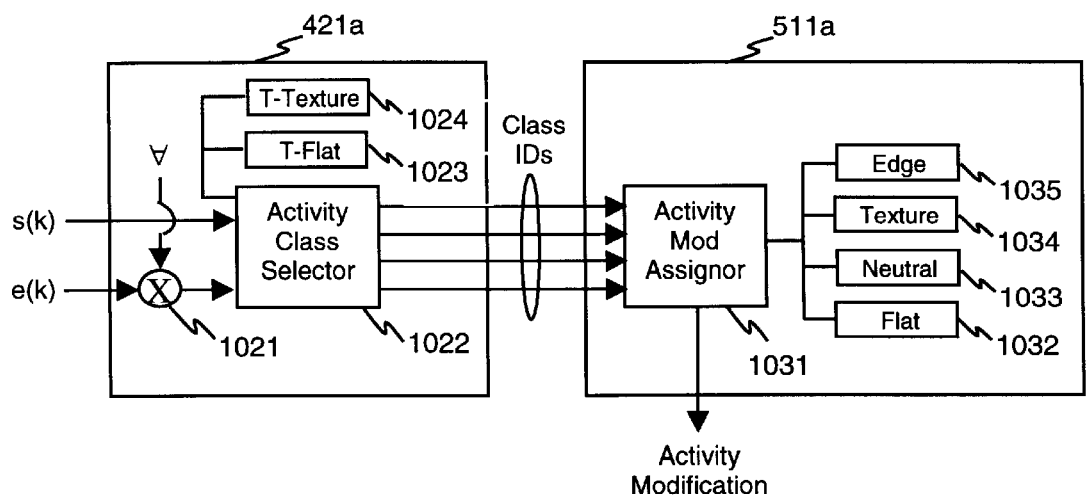
FIG. 10b is a flow diagram illustrating an example of an activity-correlator and activity-modifier pair according to an embodiment of the invention.
Figure 10C:
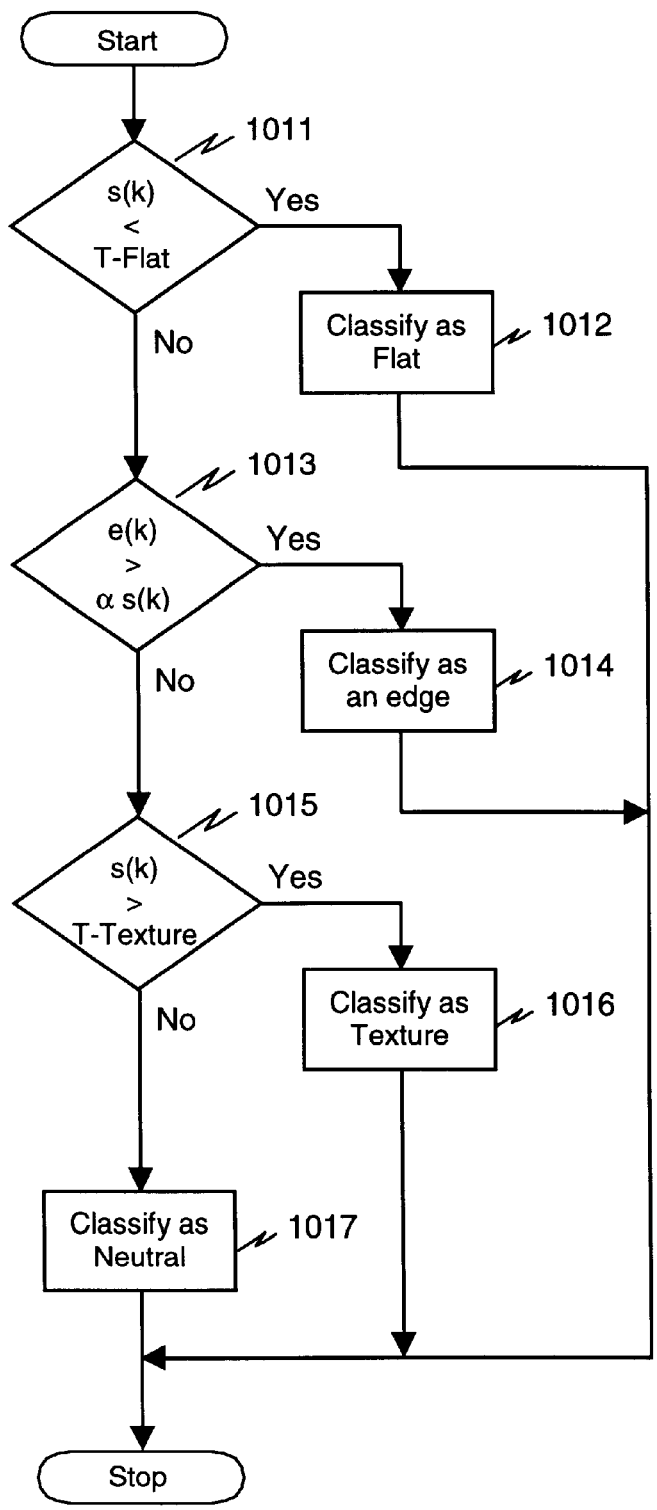
FIG. 10c is a flowchart illustrating a method for correlating an edge-based activity analysis to form picture activity classifications according to an embodiment of the invention.

Beginning with FIG. 10b, an "activity class selection" approach broadly provides for selecting activity class designations according to received energy-edge analysis results for successive pictures, and then substituting a quantization modification corresponding with the class designations. Four class designations or "activity classes" are currently utilized; these include three texture-oriented classifications (i.e. flat, normal and textured) and an attribute-detail class (i.e. currently, perceptually significant edges). The approach is weighted in favor of classifying blocks first as flat, then as having a perceptually significant edge, and otherwise as neutral or having visually significant texture content in accordance with the energy indicator value; in this way, perceivable distortion in flat or prominent edge pictures, which have the least perceptual masking ability, is avoided.

In the depicted example, activity-correlator 421a operates as a block energy-edge normalizer and block activity class selector. Activity-correlator 421a receives an energy and edge indicator pair (i.e. s(k) and e(k) respectively) for each block of a current macroblock; for each block, process 1021 normalizes e(k) by multiplying e(k) with a scale value $\alpha$ (generally from about 0.25 to about 0.75 and, more typically, 0.5). Activity class selector 1022 further assigns an activity class to each block by comparing the normalized e(k), s(k), a low texture-threshold ("T-flat") and a high texture-threshold ("T-texture"), as given by the FIG. 10c flowchart. That is, if s(k) is less than T-flat (step 1011 of FIG. 10c), then the block is classified as flat (step 1012). If not flat, then if normalized-e(k) is greater than $\alpha \times$s(k) in step 1013, the block is classified as an edge (step 1014). Finally, if neither flat nor an edge, then the block is classified as neutral (step 1017), unless s(k) is greater than T-texture (step 1016), in which case the block is classified as a texture (step 1017). Stated alternatively, if not classified as a texture class and not an edge class, then the block can further be classified as a flat, neutral or texture subclass.

Figure 10D:
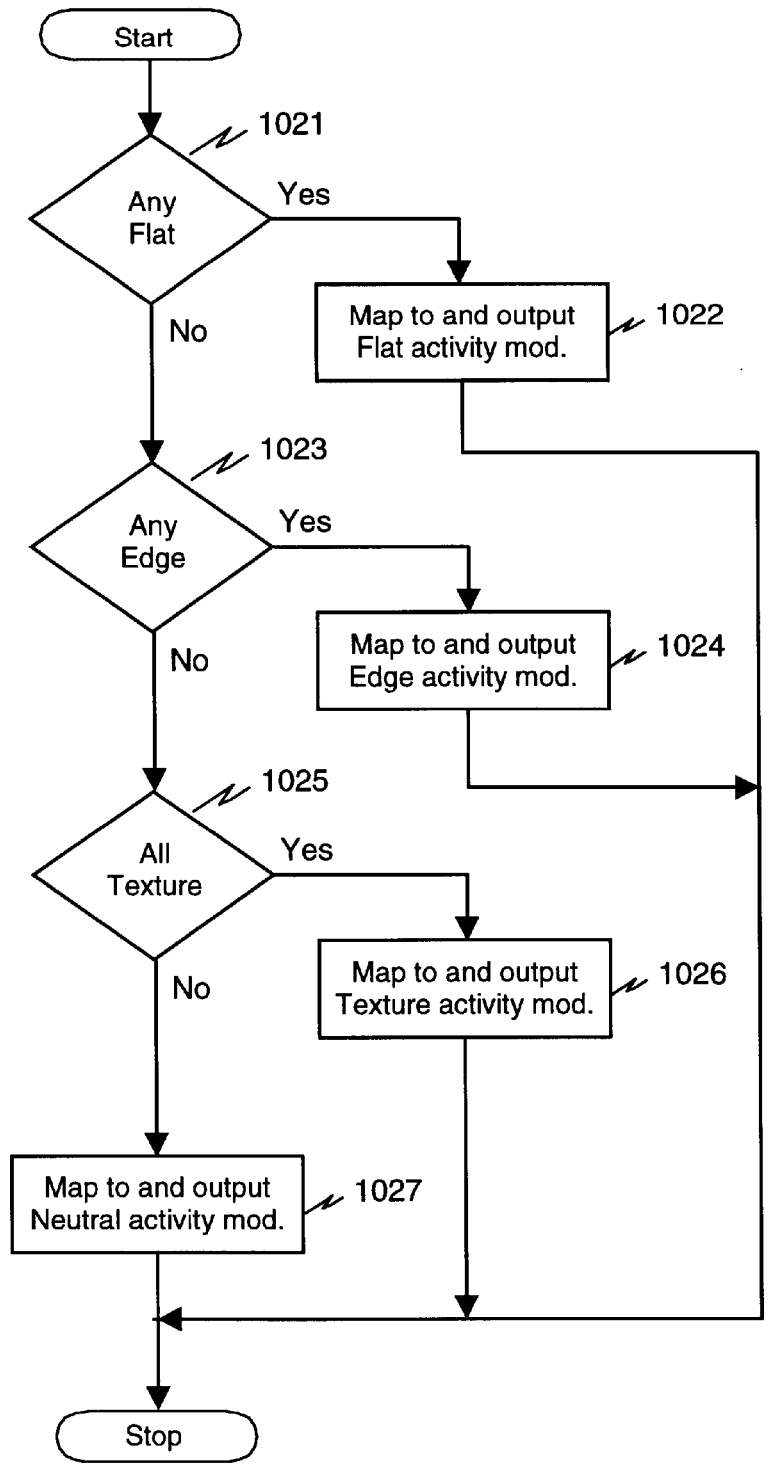
FIG. 10d is a flowchart illustrating a method for forming an activity quantization modification from picture activity classifications according to an embodiment of the invention.
Figure 10E:
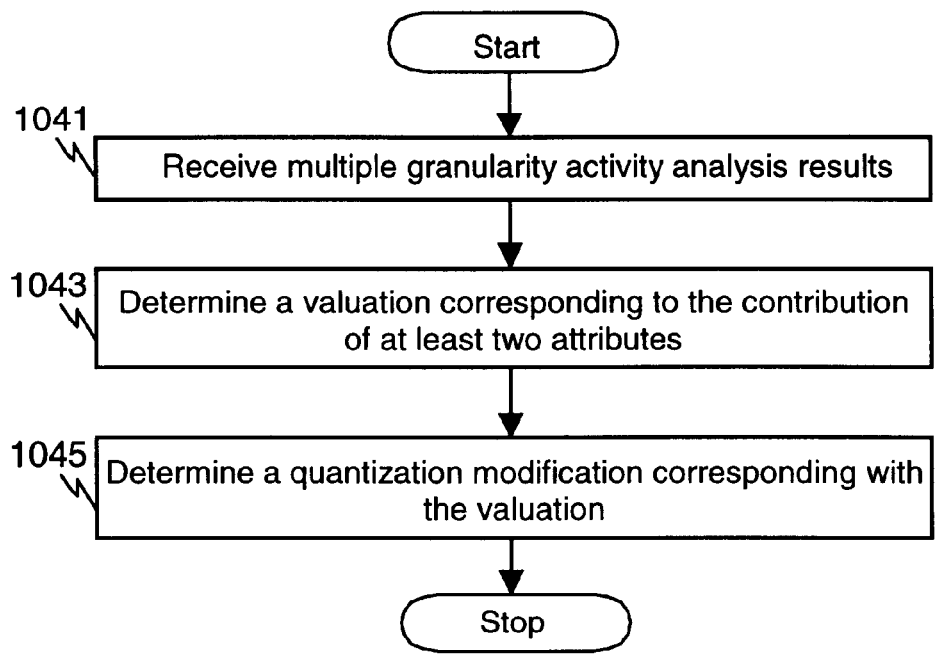
FIG. 10e is a flowchart illustrating a determinative method for forming an activity quantization modification according to an embodiment of the invention.

Returning to FIG. 10b, activity-modifier 511a receives block class identifiers ("class-IDs") from activity-correlator 421a, reduces the block class-IDs to a macroblock class and outputs an activity-masking stage quantization modification value or "activity-modification" corresponding with the macroblock class. As shown in FIG. 10d, if a class-ID for any block in a macroblock is a flat class-ID (step 1021), then a corresponding flat activity-modification is output (step 1022); if none are flat class-IDs but any class-ID is an edge class-ID (step 1023), then a corresponding edge activity-modification is output (step 1024). Finally, if the current macroblock is neither flat nor an edge and any class-ID is other than a texture class-ID (step 1025), then a corresponding neutral activity-modification is output (step 1027); otherwise, a corresponding texture activity-modification is output (step 1026).

Returning again to FIG. 10b, the activity class selection approach provides some degree of flexibility in that the scale value, classification thresholds and activity-modifications are programmable. More preferably, each such "variable" is received as a register-programmable system parameter, thereby enabling, for example, modifiable classification levels and/or quantization modification values (e.g. static, dynamic, manual, programmatic, etc.) During preliminary testing completed thus far, the following experimentally-derived values were observed to provide high-quality, low bitrate results when provided on a macroblock basis. In each case, the values were selected from an available range of 0–255: T-flat equals about 4–8; T-texture equals about 16–32; flat activity modification ("AM") equals about 0; neutral-AM equals about $0.5(Q_{Nom})$; texture-AM equals about $Q_{Nom}$.

An alternative "determinative correlation" approach selected for the encoder-IC takes into account an observed perceptually variable significance of image attribute combinations and, more particularly, the perceptual masking variability caused by different energy and edge measure combinations. The approach (FIG. 10e) broadly provides for receiving multiple-attribute (i.e. at least two) activity analysis results (step 1041), determining a valuation corresponding to the contribution of at least two attributes (step 1043), and providing a determined quantization modification corresponding with the valuation (step 1045).

For purposes of comparison with the above selection-correlation, determinative-correlation, as implemented, also enables activity-classifications according to which increasing quantization-step sizes can be applied to determined flat, edge, neutral and textured pictures (i.e. macroblocks) respectively. However, activity classification is more preferably conducted in accordance with observed energy and edge perceptual-masking contributions. In practice, three contribution-determinative activity classes are preferably used, including predominantly-textural, mixed-contribution and predominantly-edge. Such classification and subsequent class reduction are further modifiably evaluated (rather than selected).

Figure 10F:
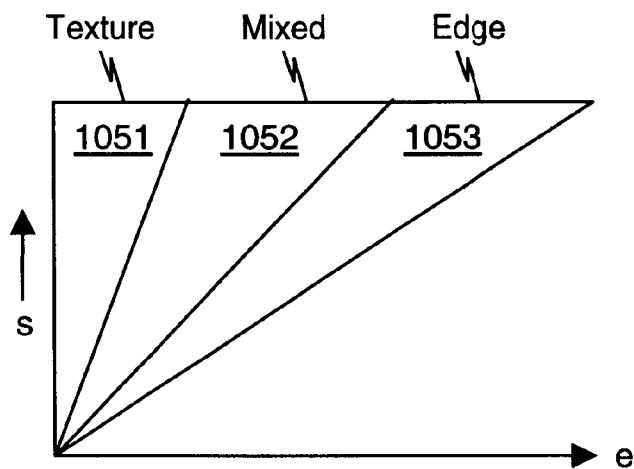
FIG. 10f illustrates an exemplary classification distribution in accordance with the determinative method of FIG. 10e

For example, FIG. 10*f* illustrates an exemplary classification distribution in which the contribution of texture (e.g. block energy) and visually significant details (e.g. edge energy) are continuously and linearly evaluated for each of predominantly-textural (1051), predominantly-edge (1053) and mixed-contribution (1052) classifications. However, as with the above approach, a variety of classification distributions consistent with available resources and/or other system constraints can also be utilized (e.g. linear, non-linear, continuous and/or static mapping, fewer or more class/subclass evaluations, etc.). In the current encoder-IC, for example, classification is simplified to provide static (i.e. single value) texture and edge classifications, and a linear continuously varying mixed classification; the mixed classification is then further quantized or "discretely mapped" such that one of up to eight potential activity-modification possibilities is produced.

Figure 10G:
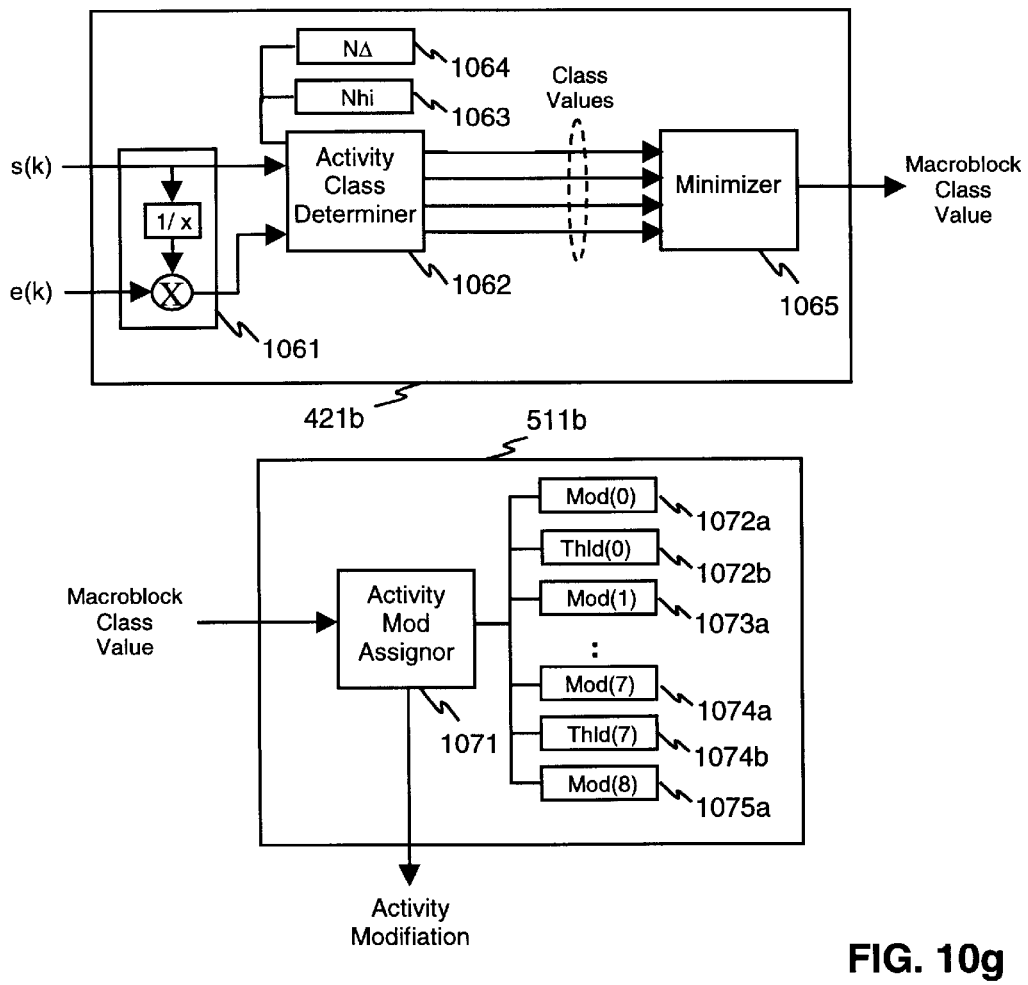
FIG. 10g is a flow diagram illustrating a further example of an activity-correlator and activity-modifier pair according to an embodiment of the invention.

Continuing with FIG. 10*g*, (determinative) activity-correlator 421*b* receives an energy and edge indicator pair (i.e. s(k) and e(k) respectively) for each block of a current macroblock; for each block, process 1061 normalizes e(k) as an energy contribution to the total block energy. Activity class determiner 1062 determines a block activity class valuation according to a programmable curve defined by a bounding value, $N_{Hi}$, and a delta value, $N_A$, although various curve/function implementations can also be used (e.g. see FIG. 10*f*). Next, process 1065 (i.e. preferably a minimum selection function) forms a macroblock valuation from the component block valuations.

Figure 10I:
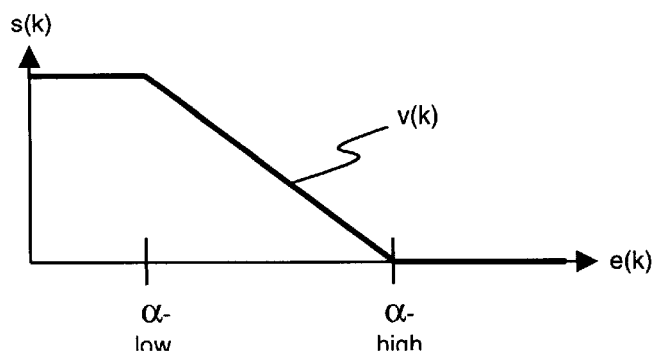
FIG. 10i is a graph illustrating an exemplary curve that can be used to determine activity-class valuations according to the method of FIG. 10h.
Figure 10H:
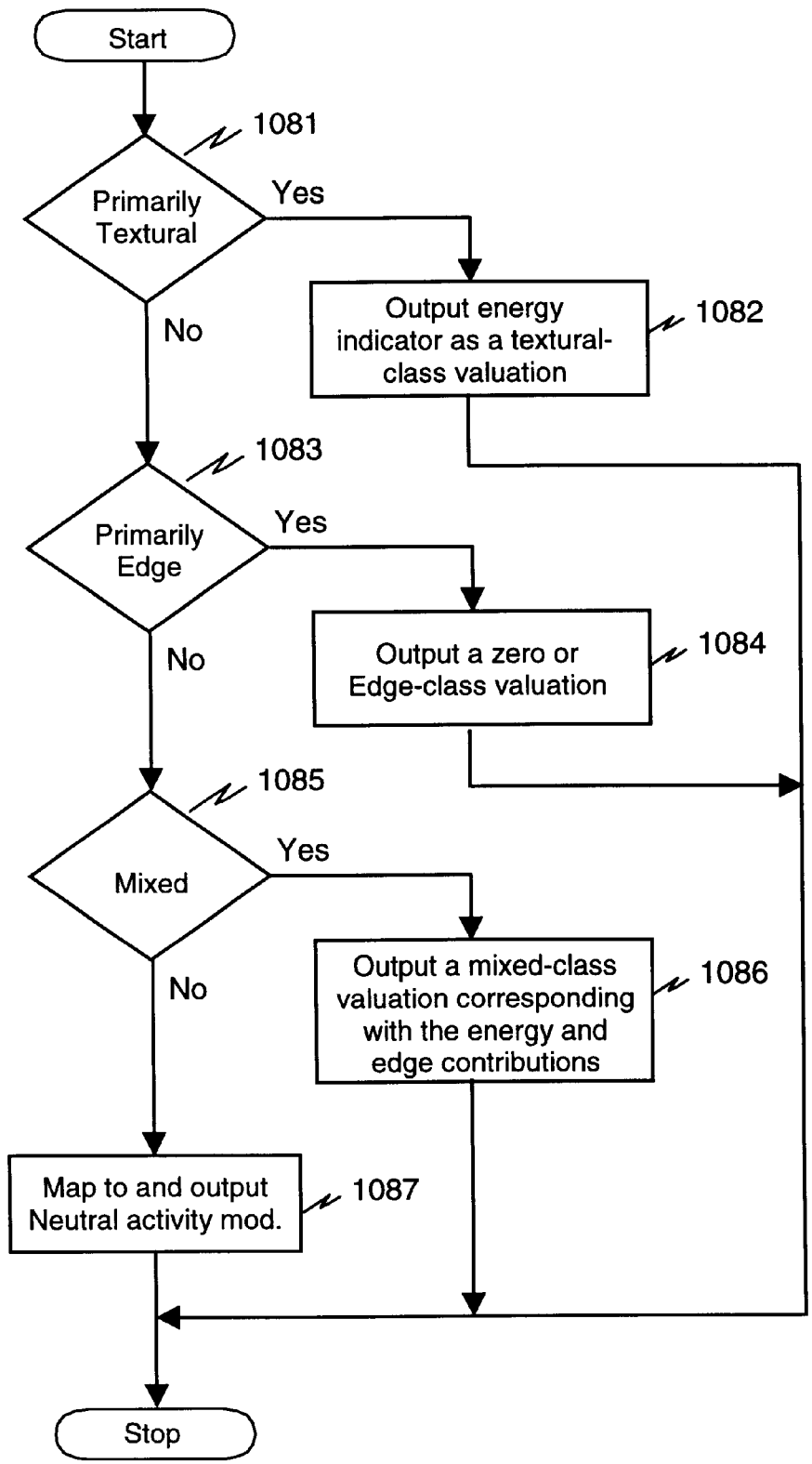
FIG. 10h is a flowchart illustrating an activity-class valuation method according to an embodiment of the invention.

The FIG. 10*h* flowchart illustrates how received blocks are currently valuated in accordance with the above-noted predominantly-textural, mixed-contribution and predominantly-edge (or, more simply, textural, mixed and edge) activity classes. As shown, if the block is primarily characterized by non-edge energy or "primarily textural" (step 1081), then the block energy indicator s(k) is output as a textural class valuation for the block (step 1082). If not primarily textural, then if the block is primarily characterized by edge energy or "primarily edge" (step 1083), an edge valuation (preferably zero) is output as an edge class valuation for the block (step 1084). Finally, if neither primarily textural nor primarily edge (step 1085), then an energy plus edge or "mixed class" valuation is output for the block (step 1086).

Determinative block classifications and valuations are more preferably conducted in accordance with a curve defined by the following equations 7 through 9 (given in pseudo-code). As shown, textural and edge classes (equations 7 and 8) are currently mapped to discrete activity valuations, while mixed class valuations are treated as variable according to relative localization of energy in detected edges; however, the use of static and/or variable (linear and/or non-linear) valuations of varying complexity can also be utilized according to design constraints. Similar variations might also be utilized in non-energy, non-edge, non-MPEG-2 and/or other activity determination possibilities (only some of which might be specifically noted herein).

If $e(k) \leq \alpha_{Low} s(k)$ Then $v(k)_{Textural} = s(k)$    Equation 7:

else, if $e(k) \geq \alpha_{High} s(k)$ then $v(k)_{Edge} = 0$    Equation 8:

else $v(k)_{Mixed} = [\alpha_{High} s(k) - e(k)] / [\alpha_{High} - \alpha_{Low}]$    Equation 9:

In equations 7–9, v(k) is a textural, edge or mixed valuation respectively and $e(k)_{Norm}$ is the normalized edge indicator for a current block k.

The FIG. 10*i* graph is an exemplary curve resulting from equation 9 for $\alpha_{Low}$, $\alpha_{High} = \{0.25, 0.75\}$, which has been found to provide particularly accurate results. However, a family of curves, rather than a fixed set of values, is preferred in accordance with experimental data. In the preferred embodiment, the family of curves is implemented by simple additive and shifting elements using two integers $N_{Hi}$ and $N_{Low}$, which define $\alpha_{High}$ and $\alpha_{Low}$, according to the equations $$\alpha_{High} = 1 - 2^{-N_{Hi}}$$    Equation 10:

and $$\alpha_{Low} = 1 - 2^{-N_{Hi}} - 2^{-N_{Low}}.$$    Equation 11:

It is found that the above edge measure, e(k), discriminates less than perfectly between edge and non-edge energy. Therefore, the specific curve utilized will depend on a best tradeoff between mis-classifying edges as non-edge energy (causing visible distortion) and mis-classifying non-edge energy as edges (wasting bits) according to the quality-bitrate and/or other goals of a particular application. (While other variations might apply, $\alpha_{Low}$ is currently found to vary from about 0 to 0.5 and $\alpha_{High}$ is currently found to vary from about 0.25 to 1.0, using a 0 to 1 scale for both.)

Returning to FIG. 10*g*, activity-modifier 511*b*, preferably operates as a register-programmable lookup table. That is, on receiving a macroblock valuation, modification value assignor 1071 compares the macroblock valuation with threshold values (supplied by seven threshold registers beginning with register 1072*a*) and outputs a corresponding activity-modification supplied by eight value registers beginning with register 1072*b*. This lookup table implementation represents a simple means of enabling a wide variety of relationships between the macroblock valuation and the activity-modification.

The use of eight (as opposed to four) activity-quantization values enables, among other things, the use of fractional bits in intermediate $M_{Quant}$ calculations and thus provides for more subtle changes in bit rate (without limit-cycle oscillations). Actual threshold and activity-quantization values (and numbers of values) can vary considerably in accordance with a particular application. However, in accordance with simulation results thus far, the Chart 1 register implementation is currently found to provide reliable translation of energy-edge activity determinations into an activity-modification in combination with the above preferred values. Note that, in this example, the modifier register values are proportional to $Q_{Nom}$ which is labeled in the chart as "q":

Chart 1:
Exemplary Activity-Modification
Register Values

| Register number | 0 | 1 | 2 | 3 | 4 | 5 | 6 | 7 |
|---|---|---|---|---|---|---|---|---|
| Threshold reg. value | n/a | 1 | 3 | 6 | 9 | 16 | 32 | 64 |
| Mod. register value | 0 | q/8 | q/4 | q/2 | 3q/4 | q | 2q | 3q |

Luminance-Sensitivity Masking

Figure 11A:
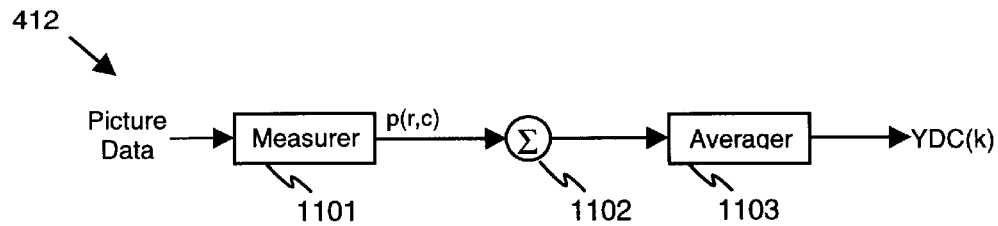
FIG. 11a is a flow diagram illustrating a luminance analyzer according to an embodiment of the invention.
Figure 11B:
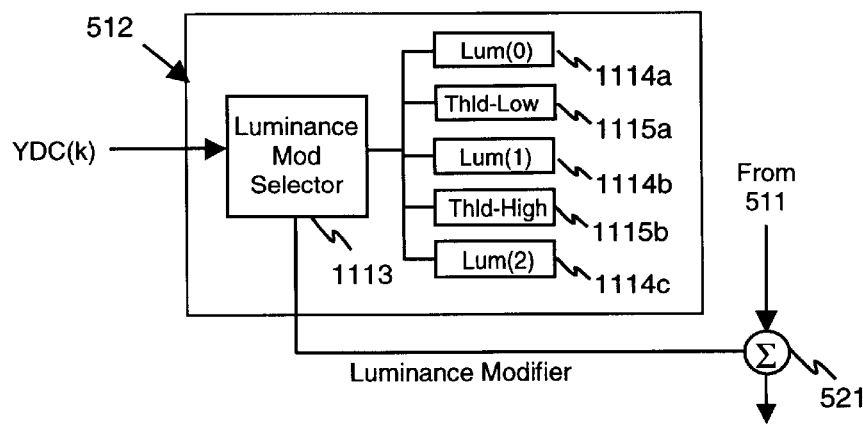
FIG. 11b is a flow diagram illustrating a luminance-sensitivity correlator and modifier pair according to an embodiment of the invention.

Turning now to FIGS. 11a and 11b with reference to FIGS. 4 and 5, elements of luminance-sensitivity stage 502 (FIG. 5) will now be discussed. Luminance-sensitivity stage 502 enables the exploitation of variable HVS sensitivity to local distortions as a function of overall luminance level. For example, a small amount of noise added to a luminance ramp signal (e.g. black on the left and white on the right) will be more noticeable in the mid-range amplitude image regions than in the very bright and dark areas.

Luminance-sensitivity determination broadly includes, measuring the picture mean luminance and correlating the mean luminance to a luminance quantization modification adder or "luminance-modification." As illustrated in FIG. 11a, luminance-sensitivity analyzer 412 receives picture data from formatter 410 (FIG. 4). Measurer 1101 (FIG. 11a) measures (e.g. retrieves) the luminance value of each pixel of a current macroblock and successive luminance values for the macroblock are accumulated by summer 1102. Averager 1103 then divides the accumulated sum by the number of pixels in the macroblock (i.e. sixty-four) to form luminance-indicator $Y_{DC}$.

Luminance-selector 1113 of luminance-correlator 512 (FIG. 11b) preferably operates as a lookup table, comparing the received $Y_{DC}$ with a low-threshold and a high-threshold and assigning a respective luminance-modification. The luminance-modification is then combined with the activity-modification by process 521 (here, a summer) to form an intermediate-modification (Other processing can also be utilized to correlate separate stage-based modifications).

As with activity-modification, luminance thresholds and modifications are preferably received as system parameters via programmable threshold registers 1114a through 1114c, and value registers 1115a and 1115c respectively. Register values found thus far to more accurately reflect luminance-sensitivity as quantization adders are given in the following Chart 2 (again indicating $Q_{Nom}$ as "q").

Chart 2:
Exemplary Luminance-Modification
Register Values

| Register number | 0 | 1 | 2 |
|---|---|---|---|
| Threshold reg. value | n/a | 10 | 200 |
| Luminance reg value | q/4 | 0 | q/2 |

Nominal-Quantization Offset

Figure 12:
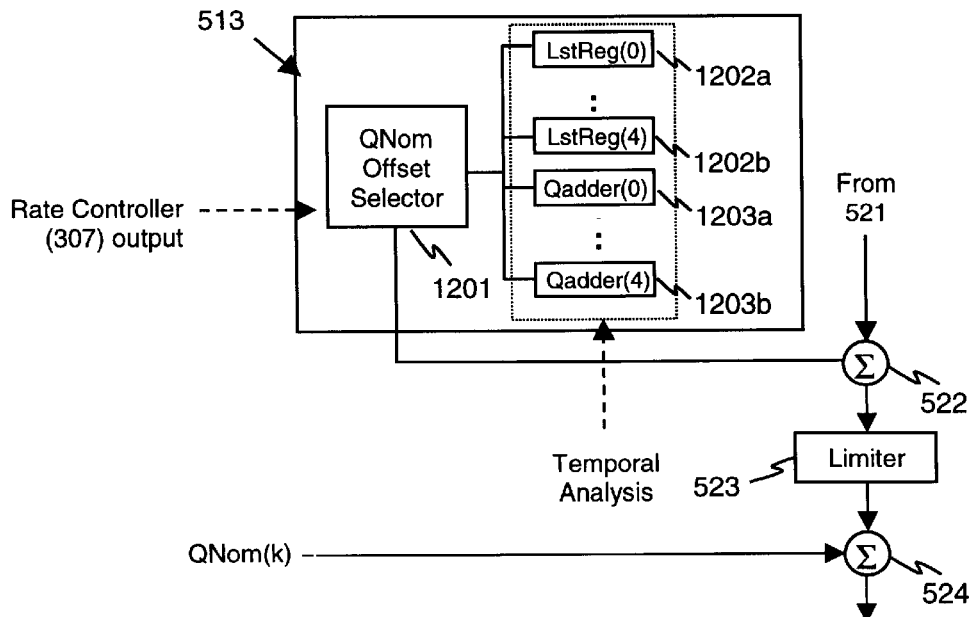
FIG. 12 is a flow diagram illustrating a nominal quantization correlator according to an embodiment of the invention.

Turning to FIG. 12 with reference to FIG. 5, quantization selector stage 503 (FIG. 5) provides yet another granularity of quantization modification. More specifically, temporal masking or "motion confusion" can also affect a small image region. However, such masking effects are typically reflected in larger regions than a macroblock, such as a slice. To handle such cases, different nominal quantization values for up to five regions per slice are provided. Temporal analysis can take many forms, but will usually include an analysis of the uniformity or regularity of the motion in the spatial vicinity of the current macroblock. A less uniform (more confusing) motion vector field results in higher adder values.

One example of temporal masking analyzes the motion vectors in the current picture into a set of regions, each region having similar motion characteristics. Each macroblock is then tested to count the number regions it is connected to (i.e. it is in or touches). Contiguous macroblocks touching more than a fixed number of motion segments are joined into a "masked" segment. Macroblocks outside of confused segments are joined into "non-masked" segments. A more severe quantization modification is applied to the masked segments. It should be clear however, that the invention enables other, more sophisticated temporal masking analysis algorithms to be used.

In the encoder-IC, quantization-selector 1201 (FIG. 12) of nominal quantization correlator 513 preferably operates as a lookup table. Where regional nominal quantization is disabled, quantization selector 1201 is capable of supplying a global nominal quantization adder (e.g. using appropriately set values). When enabled (e.g. via receipt of a positional indicator or enable signal), one of five regional nominal quantization adders consistent with a received positional location is supplied (e.g. effectively splitting a macroblock row into up to five segments). Currently, each positional indicator provides the number of the last macroblock within one of five corresponding segments. Positional and quantization adders are preferably received as system parameters via five programmable last-regional macroblock registers 1202a through 1202b, and five adder registers 1203a through 1203b.

The resultant quantization-adder is combined with the intermediate-modification by process 522. Further limiting by limiter 523 at this-point in processing enables a maximum quantization value received from the rate-controller. Following limiting, process 524 combines the limited quantization modification with the nominal quantization value $Q_{Nom}$, preferably by simple addition, to form a base quantization. Model-Quantization Correlator 422 can take many forms, including most notably a multiplicative inter-stage relationship, however, the described implementation with additive stages, a simple limiting capability and dynamic register programmability is found to be very efficient in accordance with encoder-IC considerations.

Perimeter Masking

The positional-sensitivity stage 504 of the encoder-IC (FIG. 5) enables a further positional aspect of HVS perception to be exploited in order to reduce bitrate. More specifically, in typical televisions and other display systems, there is an appreciable amount of over-scan. As a result, a bordering region often exists outside the viewable display area that is not displayed. The bordering region, where it exists, can extend along the perimeter of the viewable area horizontally, vertically or both. In such cases, it can be advantageous to reduce processing by simply not encoding the applicable regions. However, encoded video is typically distributed (e.g. by physical media, television/cable broadcast, internet, etc.) to any number of users who might use a display having varying perimeter-display characteristics. Additionally, it is also found that viewers do not tend to scrutinize edges of a picture to the same extent as the remaining regions of the viewable display area.

Preferably, both the physical variable perimeter display and perceptual reduced perimeter focus characteristics are exploited by a positional offset. More specifically, a positional-offset is provided whereby a further positional quantization modification or "positional-modification" can be applied (preferably as an added offset) to other quantization modifications.

In the encoder-IC, the positional-modification enables a further programmable modification value to be added to the base-modification where the current macroblock is positioned at the left and right most edges of the display area (vertical-perimeter), the top and bottom edges of the display area (horizontal-perimeter), or both. Those skilled in the art will appreciate, however, that a positional offset might also be applied in other ways. For example, an offset might be applied to several perimeter several rows and/or columns. In other applications, (e.g. surveillance, point-of-purchase, etc.) such an offset might also be applied to other areas of lesser interest. The offsets might further be applied as a graduated value, for example, applying lesser quantization (as an offset or correlated value) extending toward an area of greater interest, among yet other examples.

Figure 13:
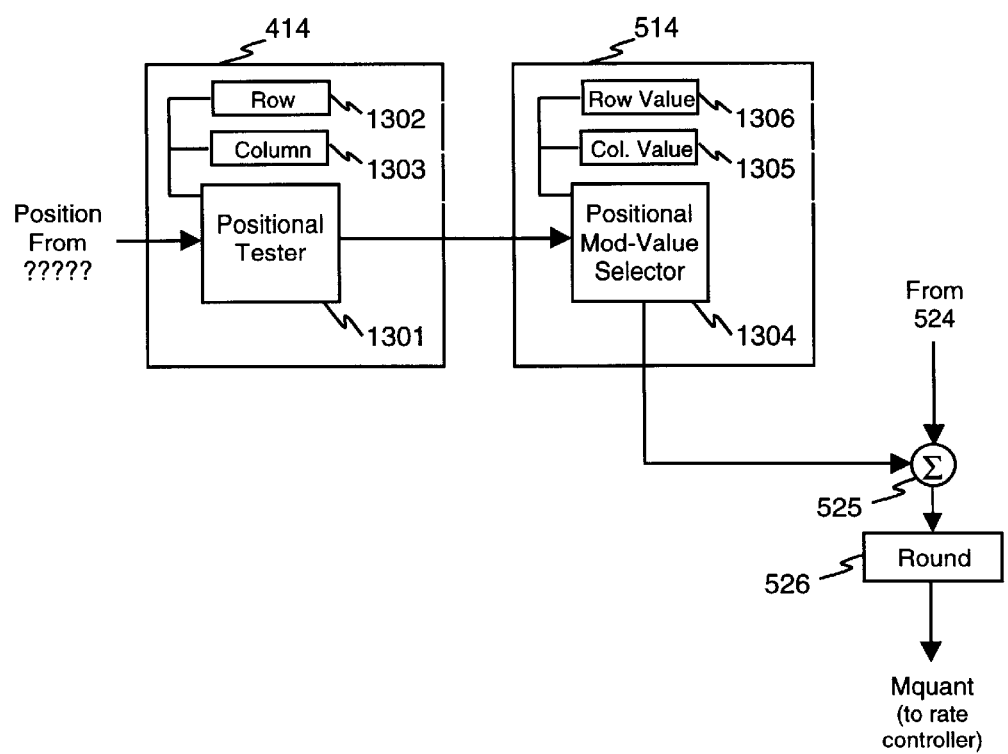
FIG. 13 is a flow diagram illustrating a positional-sensitivity correlator according to an embodiment of the invention.

Turning to FIG. 13, the positional-sensitivity stage is preferably implemented as a modifiable lookup table using programmable registers. As shown, upon receipt of the base modification by positional correlator 514, positional tester 1301 of positional analyzer 414 determines whether the current picture (e.g. macroblock) is located in a row indicated by row-register 1302 or column register 1303 and transfers the result to positional correlator 514. Within positional correlator 514, selector 1304 receives the active row-column test result and, if the test is positive, assigns a corresponding row or column offset, as provided by row-value register 1305 or column-value register 1306 respectively. Selector 1304 then transfers the offset-value (or a zero offset-value if the test fails and no perimeter offset is warranted) to summer 525, which adds the offset-value received from selector 1304 to the base-modification value. Offset values thus far found to provide perceptually desirable modification where a perimeter macroblock is displayed have ranged from about $Q_{Nom}/2$ to about 20 $Q_{Nom}$.

It should be noted that the invention includes a second, mote flexible, method to adapt quantization based on positional sensitivity. Referring to FIG. 12, note that the positional system parameters (1202) can be based on absolute position with the picture, which enables horizontal changes to quantization based purely on position. Further, the value assigned to $Q_{Nom}$ offset selector 1201 can be based on vertical position, which enables vertical changes to quantization based purely on position.

Following the positional-sensitivity stage, process 526 rounds the base modification off to the nearest integer to form $M_{Quant}$, which it then outputs (for receipt by quantizer 372 (FIG. 3b). (Note that the resultant value can also be truncated as appropriate).

While the present invention has been described herein with reference to particular embodiments thereof, a degree of latitude of modification, various changes and substitutions are intended in the foregoing disclosure, and it will be appreciated that in some instances some features of the invention will be employed without corresponding use of other features without departing from the spirit and scope of the invention as set forth.

We claim:

1. An adaptive quantization determining method, comprising:
    (a) receiving video data including picture data and a quantization value;
    (b) analyzing said picture data to produce at least two perceptual indicators corresponding to different picture attributes;
    (c) correlating said at least two perceptual indicators to form a composite quantization modification corresponding to a human visual system ("HVS") characteristic; and
    (d) modifying said quantization value in accordance with said quantization modification to produce a modified quantization value.

2. A method according to claim 1, wherein said picture data of step (a) is MPEG-2 compliant blocks.

3. A method according to claim 1, wherein said at least two perceptual indicators of step (b) comprise a picture attribute indicator and a picture detail attribute indicator.

4. A method according to claim 3, wherein said picture attribute indicator corresponds to total picture energy and said picture detail attribute indicator corresponds to a portion of total picture energy substantially localized within a picture detail.

5. A method according to claim 4, wherein said picture detail is selected from a group consisting of vertical edges, horizontal edges, and vertical and horizontal edge combinations.

6. A method according to claim 1, wherein said quantization modification of step (c) corresponds to a relative prominence of textural and edge attributes of said picture data.

7. A method according to claim 1, wherein said step (c) of correlating further comprises:
    correlating said at least two indicators to form a perceptual determination; and
    correlating said perceptual determination to form said quantization modification.

8. A method according to claim 1, wherein said modified quantization value of step (d) is a quantization step size.

9. An adaptive quantization determining method according to claim 1, further comprising:
    (e) quantizing portion data corresponding to at least a portion of said picture data in accordance with said modified quantization value to form quantized data.

10. An adaptive quantization determining method according to claim 9, wherein said quantized data comprises a transform of prediction error data.

11. A method according to claim 9, wherein said portion data of step (e) is a discrete cosine transform ("DCT") of said picture data of step (a).

12. A quantization modification formed according to the method of claim 1.

13. A method according to claim 1, wherein said at least two perceptual indicators of step (b) comprise a luminance sensitivity indicator and a temporal masking indicator.

14. A method according to claim 1, wherein said at least two perceptual indicators of step (b) comprise an activity masking indicator and a positional sensitivity indicator.

15. A storage media storing computer-readable code for performing the steps of:
    receiving video data including picture data and a quantization value;
    forming a multiple-granularity quantization modification according to said received picture data; and
    modifying said quantization value according to said quantization modification to form a modified quantization value.

16. An adaptive quantizer, comprising:
    a perceptual analyzer for forming multiple-granularity perceptual indicators corresponding to received video data;
    a correlator coupled to said perceptual analyzer for forming a quantization modification corresponding to said multiple-granularity perceptual indicators; and a quantizer coupled to said correlator for performing quantization on picture data corresponding to said received video data in accordance with said quantization modification.

17. An adaptive quantizer according to claim 16, wherein said perceptual analyzer and correlator comprise an activity-masking stage for forming an activity-masking quantization modification.

18. An adaptive quantizer according to claim 17, further comprising a luminance-sensitivity stage coupled to said activity-masking stage for forming a luminance-sensitivity quantization modification.

19. An adaptive quantizer according to claim 17, further comprising a quantization selector stage coupled to said activity-masking stage for determining a quantization offset value corresponding with said perceptual indicators.

20. An adaptive quantizer according to claim 19, wherein said quantization selector stage comprises a temporal masking analyzer.

21. An adaptive quantizer according to claim 17, further comprising a positional-sensitivity stage coupled to said activity-masking stage for forming a quantization modification according to a positionally significant portion of picture data.

22. An adaptive quantizer, comprising:
perceptual modifier means for forming a multiple-granularity quantization modification according to received picture data; and
quantizer means coupled to said perceptual modifier for quantizing picture data corresponding to said received picture data in accordance with said quantization modification.

23. An activity-masking method, comprising:
(a) receiving video data including picture data and a quantization value;
(b) analyzing portions of said picture data to produce corresponding picture activity attribute indicators;
(c) analyzing portions of said picture data to produce corresponding picture-detail indicators; and
(d) processing said indicators as a composite correlation to produce an activity-masking quantization modification.

24. An activity-masking method according to claim 23, wherein said picture data comprises a macroblock and said portions comprise non-overlapping luminance blocks of said macroblock.

25. A method according to claim 23, wherein said step (c) of analyzing comprises determining picture energy attributable to at least one edge selected from a group consisting of vertical and horizontal edges.

26. A method according to claim 23, wherein step (d) of processing comprises:
correlating a current picture energy indicator of said picture indicators with a corresponding current edge indicator of said edge indicators by
selecting an edge class determination if said current picture energy indicator is less than a minimal texture threshold and substantially less than said current edge indicator, and
otherwise selecting a texture class determination; and
selecting said quantization modification as corresponding to a selected class determination.

27. A method according to claim 26, further comprising: selecting a corresponding textural subclass determination if a texture class determination is selected.

28. A method according to claim 27, wherein said step of selecting a corresponding textural subclass determination comprises:
selecting a flat subclass determination if said current picture energy indicator is less than said minimal texture threshold;
selecting a neutral subclass determination if said current picture energy indicator is greater than said minimal texture threshold and less than a maximum texture threshold; and
otherwise selecting a texture subclass quantization modification.

29. A method according to claim 23, wherein step (d) of processing comprises:
correlating a current picture energy indicator of said picture indicators with a corresponding current edge indicator of said edge indicators by
selecting an edge class quantization modification if said current picture energy indicator is substantially less than said current edge indicator,
selecting a texture class if said current picture energy indicator is substantially greater than said current edge indicator, and
otherwise selecting a mixed class quantization modification; and
selecting said quantization modification as corresponding to a selected class determination.

30. A method according to claim 23, wherein said step (d) of processing comprises:
processing a first indicator pair including one of said picture-detail indicators and a corresponding one of said picture-detail indicators to form a first modification determination;
processing a second indicator pair including one of said picture-detail indicators and a corresponding one of said picture-detail indicators to form a second modification determination;
correlating said determinations to produce a picture modification determination; and
selecting said activity-masking quantization modification as corresponding to said picture modification determination.

31. An activity-masking modeler, comprising:
a picture attribute analyzer for determining a picture attribute of a received picture;
a picture detail attribute analyzer coupled to said picture attribute analyzer for determining a picture detail attribute of said received picture; and
an activity correlator coupled to said analyzers for correlating said attributes to form a quantization modification corresponding to a human visual system ("HVS") characteristic.

32. An activity-masking modeler according to claim 31, wherein said picture attribute analyzer comprises a picture energy analyzer and said picture detail attribute analyzer comprises an edge energy analyzer.

33. An activity-masking modeler according to claim 32, wherein said edge energy analyzer further comprises a vertical edge energy analyzer, a horizontal edge energy analyzer coupled to said vertical edge energy analyzer and an edge modifier coupled to said vertical and horizontal edge analyzers for correlating vertical and horizontal edge analyzer results.

34. An activity-masking modeler according to claim 33, wherein said edge modifier comprises a maximum edge analysis result selector.

35. A picture-detail analysis method, comprising:
receiving video data including picture data corresponding to a picture; and processing said picture data according to at least one anti-symmetric basis such that a target picture detail becomes more apparent relative to an other attribute of said picture data.

36. A method according to claim 35, wherein said picture includes an n×n pixel block and said at least one anti-symmetric basis has n basis values.

37. A method according to claim 36, wherein said step of processing comprises:
(a) receiving a column of said block,
(b) multiplying each pixel of said column segment with a corresponding basis value and accumulating resulting products to form a first accumulated product total;
(c) repeating steps (a) and (b) for each remaining column of said block to form further accumulated product totals; and
(d) adding together said accumulated product totals to form a vertical edge indicator.

38. An edge analysis method, comprising:
receiving luminance blocks of an MPEG-compliant macroblock;
processing each of said luminance blocks according to at least one vertical anti-symmetric basis to form corresponding vertical edge indicators, and processing each of said luminance blocks according to at least one horizontal anti-symmetric basis to form corresponding horizontal edge indicators; and
correlating said vertical edge indicators and said horizontal edge indicators to form a macroblock edge indicator.

39. An edge analysis method according to claim 38, wherein said at least one vertical anti-symmetric basis and said at least one horizontal anti-symmetric basis are equal.

40. An edge analysis method according to claim 38, wherein said step of correlating comprises selecting a maximum value of said vertical edge indicators and said horizontal edge indicators.

41. A method for producing a quantization modification, comprising:
(a) receiving video data including sub-pictures of a picture;
(b) analyzing a plurality of said subpictures to produce a luminance indicator; and
(c) correlating said luminance indicator to produce a corresponding luminance-sensitivity quantization modification.

42. A method according to claim 41, wherein said step (c) of correlating comprises:
quantizing said luminance indicator to form a quantized luminance indicator; and
selecting a luminance-sensitivity quantization modification corresponding to said quantized luminance indicator.

43. A method for producing a quantization modification, comprising:
receiving a positional indicator corresponding to a current picture position within a current video frame;
comparing said received positional indicator with a modification position indicator; and
selecting a corresponding quantization modification value corresponding to said position if said positional indicator corresponds with said modification positional indicator.

44. A method according to claim 43, wherein said quantization modification is a row-selectable and column-selectable perimeter offset.

45. A method for determining a perceptually adaptive quantization value, comprising:
receiving video data including block data for a current macroblock and a nominal quantization value;
forming an activity quantization modification corresponding to a block energy and edge analysis correlation;
forming a luminance-sensitivity quantization modification corresponding to a block luminance analysis correlation;
forming a quantization offset quantization modification corresponding to a temporal masking analysis correlation;
combining said quantization modifications to produce an intermediate modification;
limiting said intermediate modification to form a limited intermediate modification;
forming a positional quantization modification; and
combining said limited intermediate modification, said nominal quantization value and said positional quantization modification to form said perceptually adaptive quantization value.

* * * * *